United States Patent
Nagasawa

(10) Patent No.: US 9,403,210 B2
(45) Date of Patent: *Aug. 2, 2016

(54) STEERING COLUMN AND MANUFACTURING METHOD THEREOF, AND STEERING APPARATUS USING THIS STEERING COLUMN

(75) Inventor: Makoto Nagasawa, Gunma (JP)

(73) Assignee: NSK Ltd. (JP)

(*) Notice: Subject to any disclaimer, the term of this patent is extended or adjusted under 35 U.S.C. 154(b) by 160 days.

This patent is subject to a terminal disclaimer.

(21) Appl. No.: 13/810,912

(22) PCT Filed: Jul. 23, 2012

(86) PCT No.: PCT/JP2012/068627
§ 371 (c)(1),
(2), (4) Date: Jul. 7, 2014

(87) PCT Pub. No.: WO2013/015257
PCT Pub. Date: Jan. 31, 2013

(65) Prior Publication Data
US 2014/0311273 A1    Oct. 23, 2014

(30) Foreign Application Priority Data

Jul. 26, 2011  (JP) ................. 2011-162686
Jul. 26, 2011  (JP) ................. 2011-162687
Jul. 26, 2011  (JP) ................. 2011-162688
Jul. 26, 2011  (JP) ................. 2011-162690
Aug. 22, 2011  (JP) ................. 2011-180449

(51) Int. Cl.
*B62D 1/16* (2006.01)
*B22D 19/04* (2006.01)
(Continued)

(52) U.S. Cl.
CPC .............. *B22D 19/045* (2013.01); *B22D 19/16* (2013.01); *B62D 1/16* (2013.01); *B22D 17/00* (2013.01)

(58) Field of Classification Search
CPC ............. B62D 1/16; B62D 1/185; B62D 1/19

USPC .......... 280/775, 777; 74/492, 493; 403/109.1, 403/359.1, 359.4, 359.5
See application file for complete search history.

(56) References Cited

U.S. PATENT DOCUMENTS 5,623,756 A * 4/1997 Yanagidate .............. B21K 1/10
                                                                 280/777

(Continued)

FOREIGN PATENT DOCUMENTS

GB    2273451    6/1994
JP    48-33566    10/1973

(Continued)

OTHER PUBLICATIONS

English language translation of an Office Action filed by the State Intellectual Property Office of China (SIPO) during examination of a corresponding Chinese patent application No. 201210262151.5; (Office Action published Jun. 24, 2014).

*Primary Examiner* — Toan To
(74) *Attorney, Agent, or Firm* — Hartman Global IP Law; Gary M. Hartman; Michael D. Winter

(57) ABSTRACT

Construction is achieved that is capable of maintaining overall strength of a cylindrical-shaped steering column, while at the same time making it possible to make the thickness part of the steering column thin. An outer column 10b, which is a column member of a steering column is formed by connecting in the axial direction a main portion 18 made using a light metal alloy with a cylindrical member 19 made of an iron-based alloy. A ring 22 made using a metallic material is fitted and fastened to the inner diameter side of the cylindrical member 19 in the connecting section between the main portion 18 and the cylindrical member 19. The inner diameter of the ring 22 is equal to or greater than the inner diameter of the portion of the main portion 18 that is separated in the axial direction from the connecting section with the cylindrical member 19, and is equal to or less than the inner diameter of the cylindrical member 19.

15 Claims, 20 Drawing Sheets

(51) Int. Cl.
*B22D 19/16* (2006.01)
*B22D 17/00* (2006.01)

(56) References Cited

U.S. PATENT DOCUMENTS

| | | | | |
|---|---|---|---|---|
| 5,718,131 | A * | 2/1998 | Bobbitt, III | B60R 25/02107 29/517 |
| 5,722,300 | A * | 3/1998 | Burkhard | B62D 1/185 280/775 |
| 6,530,599 | B1 * | 3/2003 | Oka | B62D 1/192 188/371 |
| 6,733,039 | B2 * | 5/2004 | Honda | B62D 1/16 267/141.2 |
| 8,549,953 | B2 * | 10/2013 | Schnitzer | B62D 1/185 280/775 |
| 2008/0252056 | A1 | 10/2008 | Moriyama et al. | |
| 2014/0150596 | A1 * | 6/2014 | Nagasawa | B22D 19/04 74/492 |
| 2014/0246847 | A1 * | 9/2014 | Nagasawa | B62D 1/16 280/771 |
| 2014/0311273 | A1 * | 10/2014 | Nagasawa | B62D 1/16 74/492 |
| 2015/0075316 | A1 * | 3/2015 | Iwakawa | B62D 1/181 74/493 |
| 2015/0166008 | A1 * | 6/2015 | Suemasu | B60R 25/021 74/492 |
| 2015/0166093 | A1 * | 6/2015 | Moriyama | B62D 1/189 74/493 |

FOREIGN PATENT DOCUMENTS

| | | |
|---|---|---|
| JP | 1994-008150 | 1/1994 |
| JP | 1994008150 | 2/1994 |
| JP | 2003-072517 | 3/2003 |
| JP | 20070153088 | 6/2007 |
| JP | 2007223383 | 9/2007 |
| JP | 2008265646 | 11/2008 |
| JP | 2011-073547 | 4/2011 |

\* cited by examiner (A)

(B)

(A)

(B)

(C)

(A)

(B)

(C)

STEERING COLUMN AND MANUFACTURING METHOD THEREOF, AND STEERING APPARATUS USING THIS STEERING COLUMN

TECHNICAL FIELD

The present invention relates to a steering apparatus for an automobile, and particularly to a steering column of the steering apparatus and a manufacturing method thereof.

BACKGROUND ART

As a steering apparatus for applying a steering angle to steered wheel (normally, front wheels except in the case of special vehicles such as a forklift), construction as illustrated in FIG. 27 is well known. In this steering apparatus, a steering shaft 3 is supported on the inner-diameter side of a cylindrical steering column 2 that is supported by the vehicle 1 so as to be able to rotate. A steering wheel 4 is fastened to the rear end section of the steering shaft 3 that protrudes further toward the rear than the opening on the rear end of the steering column 2. As the steering wheel 4 is rotated, this rotation is transmitted to an input shaft 8 of a steering gear unit 7 by way of the steering shaft 3, a universal joint 5a, an intermediate shaft 6 and a universal joint 5b. As the input shaft 8 rotates, a pair of tie rods 9 that are located on both sides of the steering gear unit 7 are pushed and pulled, and a steering angel is applied to the pair of left and right steered wheels according to the amount that the steering wheel 4 is operated.

In the construction illustrated in FIG. 27, in order to make it possible to adjust the forward-backward position of the steering wheel 4, a steering column 2 and a steering shaft 3 that can extend and contract are used. Moreover, the steering column 2 and steering shaft 3 comprise a mechanism for making it possible to protect the driver when the body of the driver collides with the steering wheel 4 during a secondary collision that occurs with during a collision accident after the automobile collides with another automobile in a primary collision, by absorbing the impact energy during this secondary collision and allowing the steering wheel 4 to displace in the forward direction. More specifically, construction is employed wherein the steering shaft 3 that supports the steering wheel 4 is supported by the vehicle body 1 so as to be able to displace in the forward direction due to an impact load in the forward direction during a secondary collision. In the construction illustrated in FIG. 27, the steering shaft 3 is composed of an outer tube 11 and an inner shaft, and together with the outer tube 11 being able to displace in the forward direction while the entire length of the steering shaft 3 contracts due to an impact load during a secondary collision, the steering column 2 that supports the steering shaft 3 is composed of an outer column 10 and an inner column, and this outer column 10 is supported by the vehicle body 1 so as to be able to displace in the forward direction while the entire length of the steering column 2 contracts. The forward-backward position of the outer column and inner column of this extending and contracting type of steering column, and the outer tube and inner shaft of this steering shaft can also be opposite that of the construction illustrated in the figure.

On the other hand, as measures against theft of the automobile, an automobile may comprise various kinds of anti-theft apparatuses. As one of these anti-theft apparatus, a steering lock apparatus that makes it impossible to operate the steering wheel except when a proper key is used is in widespread use. FIG. 28 illustrates an example of construction of a steering lock apparatus that is disclosed in JP 2008-265646 (A). The steering apparatus 12 is provided with a lock unit 13 in part of the steering column 2a, and a key-lock collar 15, in which an engaging concave section 14 is formed in at least one location in the circumferential direction, is fitted around and fastened to a position of the steering shaft 3a, the phase in the axial direction of which coincides with that of the lock unit 13. During operation (when the key is locked), the tip end section of a lock pin 16 of the lock unit 13 is caused to displace in a direction toward the inner-diameter side of the steering column 2a through a lock through hole 17 that is formed in the middle section in the axial direction of the steering column 2a, and by engaging with the engaging concave section 14, makes it practically impossible for the steering shaft 3a to rotate.

When this kind of steering lock apparatus 12 is assembled in a steering apparatus, the lock unit 13 is provided on the outer-diameter side of the steering column 2a, and the key-lock collar 15 is provided on the inner-diameter side of the steering column 2a. Therefore, in order to place the key-lock collar 15 on the inner-diameter side of the steering column 2a so as to be able to rotate, and in order to make it possible for the lock pin 16 and the key-lock collar 12 to engage or disengage without an excessive stroke of the lock pin 16, it is necessary to make at least the outer diameter of the portion of the steering column 2a where the steering lock apparatus is assembled small, and to make the inner diameter large, and to make the thickness of this portion of the steering column 2a thin.

FIG. 29 illustrates an outer column 10a of a steering column that is disclosed in JP 2007-223383 (A). Inside one end section (left end section in FIG. 29) in the axial direction of the outer column, fitted is the other end section of the cylindrical inner column, so that relative displacement in the axial direction is possible. The outer column 10a is made of a light alloy such as an aluminum alloy, or magnesium alloy, and is integrally formed by casting, and a lock through hole 17a for assembling a steering lock apparatus 12 such as illustrated in FIG. 28 is provided in the middle section in the axial direction. When the thickness of this kind of outer column 10a is thin, there is a possibility that the strength of the outer column 10a that is necessary when the steering lock apparatus 12 is operated may not be sufficiently maintained. In other words, when the lock pin 16 that protrudes through the lock through hole 17a toward the inner-diameter side of the outer column 10 is engaged with the engaging concave section 14 (see FIG. 28) on the key-lock collar 15, and an attempt is made to rotate the steering wheel 4 (see FIG. 27) with a large force, an excessively large force is applied to the perimeter edge section of the lock through hole 17a, and there is a possibility that this perimeter edge section may deform. It is feasible to form the outer column 10a using an iron alloy, however, a problem occurs in that the overall weight of the steering column increases.

RELATED LITERATURE

Patent Literature

Patent Literature 1 JP 2008-265646 (A)
Patent Literature 2 JP 2007-223383 (A)

SUMMARY OF THE INVENTION

Problem to be Solved by the Invention

Taking the situation above into consideration, the object of the present invention is to achieve construction wherein the thickness of part of the cylindrical steering column is thin, and the strength of the steering column can be maintained.

Means for Solving the Problems

The steering column of the present invention has a cylindrical shape as a whole, with all or part of the steering column being composed of a column member. This column member has: a main portion that is made using a light metal alloy such as an aluminum alloy or magnesium alloy; a cylindrical member that is made using an iron-based alloy, and that is connected to an end section on one side of the main portion in the axial direction with an end section on the other side of the cylindrical member fitted with the end section on the one side of the main portion; and a ring made using a metal material that is fitted and fastened inside the inner diameter side of the connecting section between the main portion and the cylindrical member. Here, the one side means one side in the axial direction of the steering column, and the other side means the opposite side in the axial direction.

Preferably, the inner diameter of the ring is equal to or greater than the inner diameter of the portion of the main portion that is separated in the axial direction from the connecting section, and is equal to or less than the inner diameter of the cylindrical member.

Moreover, preferably, the ring is made using a light metal alloy such as an aluminum alloy or a magnesium alloy.

In one specified form of the steering column of the present invention, the column member has construction wherein the end section on the other side of the cylindrical member is fitted into the end section on the one side of the main portion, and the ring is fitted and fastened inside the inner circumferential surface of the connecting section between the main portion and the cylindrical member.

In this case, the ring is positioned in the axial direction so that an end edge on the one side of the main portion is located on the outside in the radial direction of the middle section in the axial direction of the ring.

Furthermore, preferably, an outward facing flange-shaped flange section that protrudes outward in the radial direction is provided on an end section on the other side of the ring, and a side surface on the one side of this flange section comes in contact with an end surface on the other side of the cylindrical member.

In another form of the invention, the column member has construction wherein the end section on the other side of the cylindrical member is fitted onto the end section on the one side of the main portion, and the ring is fitted and fastened into the inner circumferential surface of the connecting section between the main portion and the cylindrical member.

Furthermore, in another form of the invention, the outer diameter of the ring is smaller than the inner diameter of the connecting section between the main portion and the cylindrical member, and the ring is fitted and fastened inside the inner diameter side of the connecting section between the main portion and the cylindrical member in a state where a gap is formed between the outer circumferential surface of the ring and the inner circumferential surface of the end section on the other side of the cylindrical member.

The steering column of the present invention can be suitably used in a steering apparatus that comprises a steering lock apparatus, and, in this case, a lock through hole of the steering lock apparatus is provided at one location in the middle section in the axial direction of the cylindrical member.

The manufacturing method for a steering column of the present invention is characterized by obtaining a column member by the following steps. In other words, the column member is obtained by steps of fitting the ring into the end section on the other side of the cylindrical member; inserting the end section on the other side of the cylindrical member into an insertion hole that is open on an end surface of the one side of a die, such that the end section on the other side of the cylindrical member protrudes into the die; inserting an end section on the one side of a core cylinder through the ring; and forming the main portion by feeding molten light metal alloy into the die. As long as there is no conflict, the order of these steps can be changed.

Preferably, the main portion is formed so that the inner diameter of the ring is smaller than the inner diameter of the main portion, and the inner diameter of the cylindrical member is larger than the inner diameter of the portion of the main portion that is separated in the axial direction from the connecting section, and after the main portion is formed, the method comprises further a step of performing a machining on a portion on the inner diameter side of the ring so as to make the inner diameter of this ring equal to or greater than the inner diameter of the portion of the main portion that is separated in the axial direction from the connecting section, and equal to or less than the inner diameter of the cylindrical member.

Moreover, in one form of the manufacturing method for a steering wheel of the present invention, the outer diameter of the ring is made to be smaller than the inner diameter of the end section on the other side of the cylindrical member that will become the connecting section between the main portion and the cylindrical member, and in a state where a gap is formed between the outer circumferential surface of the ring and the inner circumferential surface of the end section on the other side of the cylindrical member, the ring is fitted and fastened into the end section on the other side of the cylindrical member.

In addition, in another form, a die having a stepped section on the inner diameter side of the portion near the end section on the one side is used as the die, and with the end section on the other side of the cylindrical member protruding into the die, the stepped section of this die is placed on the outside in the radial direction around the middle section in the axial direction of the ring, and by feeding part of the molten metal toward this stepped section, the end edge of the main portion is formed.

Furthermore, in another form, a ring that is provided with an outward facing flange-shaped flange section that protrudes outward in the radial direction in an end section on the other side thereof is used as the ring, and a side surface on the one side of this flange section comes in contact with an end surface on the other side of the cylindrical member, and the end section on the other side of this ring protrudes into the die.

The steering apparatus of the present invention comprises a steering column that is supported by a vehicle body; a steering shaft that is supported on the inner diameter side of the steering column so as to be able to rotate; and a steering lock apparatus that is provided between the steering column and the steering shaft and that substantially prevents the steering shaft from rotating inside the steering column when in operation; wherein the steering apparatus is particularly characterized by using the steering column of the present invention as the steering column.

Effect of the Invention

With the steering column of the present invention, it is possible to maintain the strength of the steering column, while at the same time make the thickness of part of the steering column thin. In other words, the portion near one end of the column member of this steering column is composed of a cylindrical member made using an iron-based alloy, so it is possible to maintain the strength of the portion near this one end even though the thickness of the portion near this one end is thin. On the other hand, the portion near the other end of the column member is composed of a main portion that is made using a light metal alloy such as an aluminum alloy or magnesium alloy, so the overall weight of the steering column is not increased excessively.

Moreover, the inner diameter of the column member of the steering column can be increased in order from the main portion, the ring and the cylindrical member. Furthermore, when machining the inner diameter of the connecting section between the main portion and the cylindrical member, the cylindrical member having a thin thickness is not cut, so it is possible to prevent a decrease in strength of the cylindrical member.

In addition, the steering column of the present invention does not have complex construction, so it can be industrially produced with good efficiency and low cost.

MODES FOR CARRYING OUT THE INVENTION

Example 1

Figure 1:
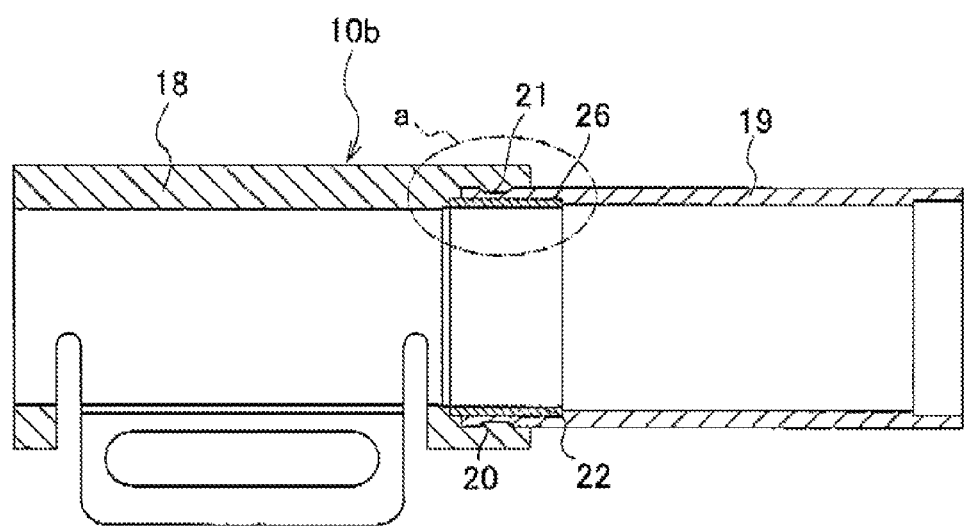
FIG. 1 illustrates a first example of an embodiment of the present invention, and is a cross-sectional view of a column member for a steering column.
Figure 2:
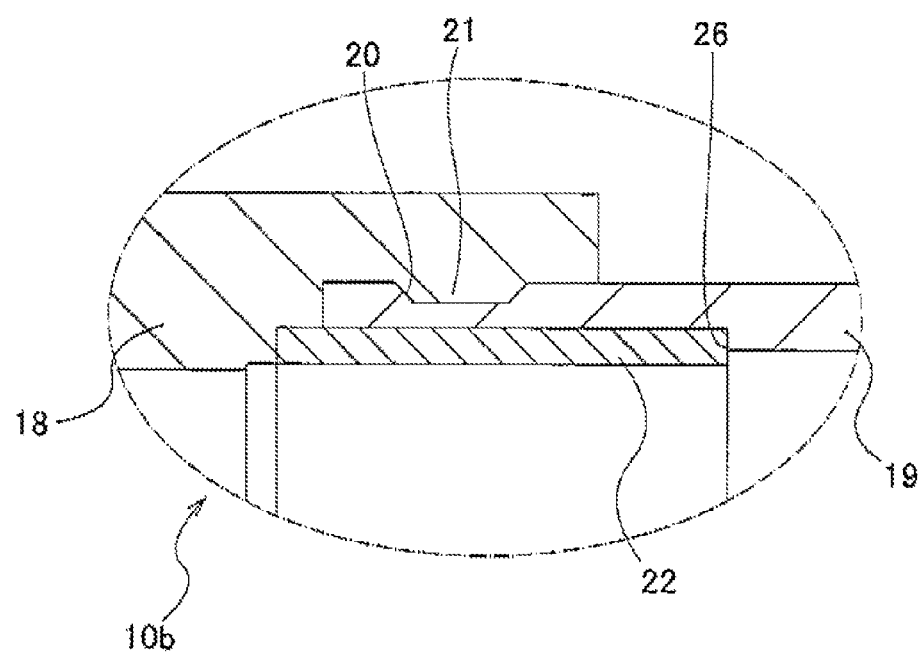
FIG. 2 is an enlarged view of part "a" in FIG. 1
Figure 3:
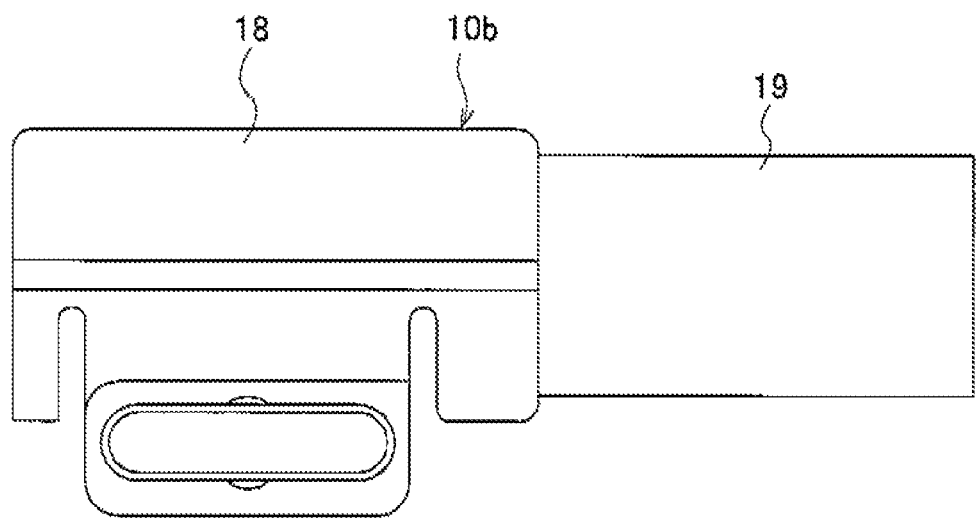
FIG. 3 is a side view of the column member of a first example of an embodiment of the present invention.
Figure 4:
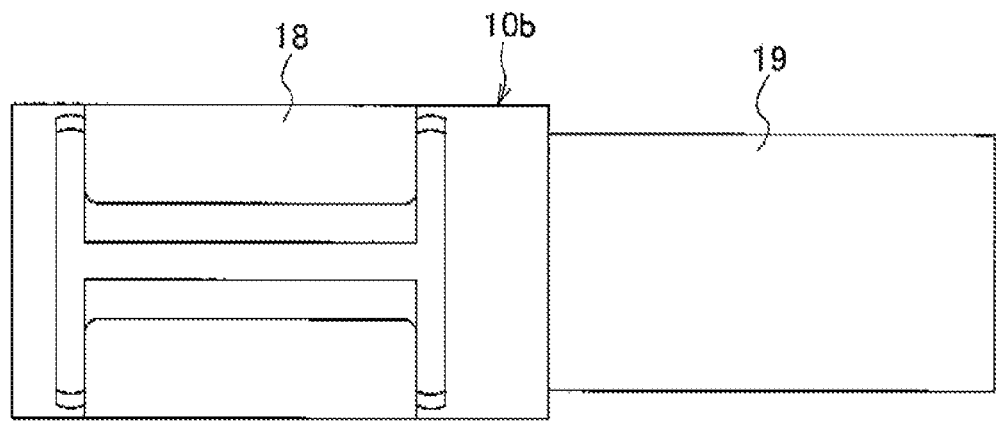
FIG. 4 is a view as seen from underneath in FIG. 3.

FIG. 1 to FIG. 5C illustrate a first example of an embodiment of the present invention. Including this example, a feature of the steering column of the present invention is industrially achieving construction that is capable of maintaining strength even when the thickness of the rear half section (right side in FIG. 1 to FIG. 5C) of the outer column, which is a column member of the steering column, is thin. The construction and functions of the other parts are the same as in a conventional steering column and manufacturing method, so drawings and explanations of identical parts will be omitted or simplified, with the explanation below centering on the features of this example.

In this example, the outer column 10b is composed of a main portion 18 that is made using a light alloy such as an aluminum alloy or magnesium alloy, and a cylindrical member 19 which is made using an iron-based alloy such as carbon steel plate that are connected together in the axial direction. In other words, the front end section (left side in FIG. 1 to FIG. 5C), which is an end section on the other side, of the cylindrical member 19, is fitted and fastened inside the rear end section (right side in FIG. 1 to FIG. 5C), which is an end section on one side, of the main portion 18. Therefore, the main portion 18 is the front half section of the outer column 10b and the cylindrical member 19 is the rear half section of the outer column 10b. The main portion 18 is the portion of steering column or outer column 10b that comprises construction for being supported by and fastened to the vehicle body. One side means one side in the axial direction of the steering column, and the other side means the opposite side in that axial direction, and in the example in the drawings, the side toward the rear of the vehicle is taken to be the one side and the side toward the front of the vehicle is taken to be the other side. However, in the present invention, when the cylindrical member is connected to the front side of the main portion, the side toward the front of the vehicle becomes the one side, and the side toward the rear of the vehicle becomes the other side. Furthermore, construction wherein cylindrical members are connected to both sides of the main portion is also included in the present invention.

A concave groove 20 is formed around the circumferential direction on part in the axial direction of the outer circumferential surface of the front end section of the cylindrical member 19. By engaging a protrusion 21 that is provided around the inner circumferential surface of the rear end section of the main portion 18 in the concave groove 20, the main portion 18 and the cylindrical member 19 are connected in the axial direction.

A ring 22 having a cylindrical shape as whole is fitted and fastened inside the inner circumferential surface of part in the axial direction of the front end section of the cylindrical member 19 and the rear end section of the main portion 18, which are the connecting section between the main portion 19 and the cylindrical member 19. The inner diameter of this ring 22, as will be described later, by performing machining of the inner circumferential surface of the ring 22, is equal to or greater than the inner diameter of a portion of the main portion 18 that is separated in the axial direction from the connecting section between the main portion 18 and the cylindrical member 19, and is equal to or less than the inner diameter of the cylindrical member 19. The connecting section between the main portion 18 and the cylindrical member 19 means the portion of the rear end section of the main portion 18 that overlaps in the axial direction the cylindrical member 19 or the ring 22.

Moreover, the material of the ring 22 can be a light metal alloy or an iron-based alloy, however, preferably is a light metal alloy such as an aluminum alloy or magnesium alloy. When the ring 22 is made using a light metal alloy, the cost and time for the work of machining the inner circumferential surface of the ring 22 can be reduced when compared with the case of being made using a relatively hard metal such as an iron-based alloy. Moreover, by making the main portion 18 and the ring 22 using the same ling metal alloy, it is possible to make the cutting resistance the same, which improves processing precision.

In order to manufacture the steering column of this example, as illustrated in FIG. 5A, the front end section of the cylindrical member 19 is inserted and fitted inside an opening in the outside surface 24, which is the surface on the one side of a die 23, and the front end section of the cylindrical member 19 protrudes inside the die 23. The shape of the inner circumferential surface that defines the insertion hole 25 of the die 23 coincides with the outer shape of the main portion 18 that is obtained by the manufacturing method of this example.

The ring 22 is fitted inside the front end section of the cylindrical member 19 with an interference fit beforehand. In order that, when pressure fitting the ring 22 inside the cylindrical member 19, the ring 22 will stop at the correct position without being inserted all the way to the back side (right side in FIG. 5) of the cylindrical member 19, a stepped section 26 is formed around the inner circumferential surface of the middle section in the axial direction of the cylindrical member 19 such that the inner diameter of the portion nearer to the rear end than this stepped section 23 is smaller than the outer diameter of the ring 22. Moreover, a stepped section 27 is formed around the inner circumferential surface of the die 23 and is located on the outside in the radial direction of the middle section in the axial direction of the ring 22.

A core cylinder 28 is inserted inside the insertion hole 25 of the die 23 from the other side (side in the axial direction opposite from the outside surface 24), and the tip end section, which is the end section on the one side, of the core cylinder 28 is inserted and fitted inside the ring 22. Here, the ring 22 is pressed toward the back side (stepped section 26) of the cylindrical member 19 by a stepped surface 31 that is formed between the tip end section 29 and the base end section 30 of the core cylinder 28. Therefore, the internal space of the die 23 is defined by the die 23, the front end section of the cylindrical member 19, the ring 22 and the core cylinder 28.

Figure 5:
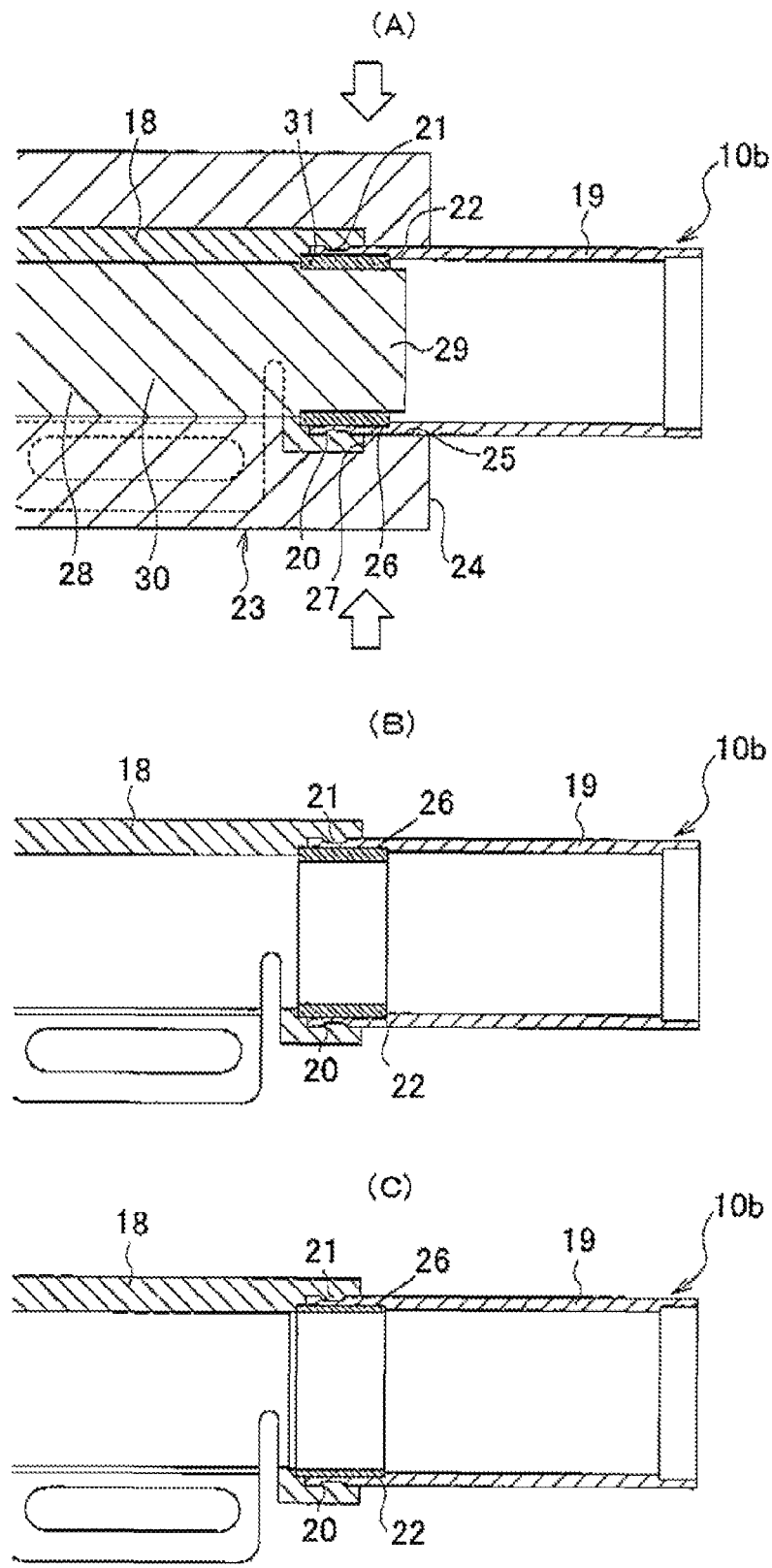
FIGS. 5A to 5C are partial cross-sectional views illustrating the processing steps of a manufacturing method for manufacturing a steering column of the first example of an embodiment of the present invention.

In this state, molten light metal alloy such as aluminum alloy or magnesium alloy is fed into the die 23, and then pressure is applied to the die 23 from above and below as illustrated by the arrow in FIG. 5A. This pressure causes the internal space of the die 23 to become sealed, and it becomes possible to feed the molten metal with sufficient pressure into the internal space of the die 23, and in doing so, the main portion 18 is formed. During this time, by molten method entering into the concave groove 20 of the cylindrical member 19, the protrusion 21 is formed on the inner circumferential surface of the main portion 18. Moreover, the stepped section 27 is located on the outside in the radial direction of the middle section of the ring 22, so the edge on the rear end (edge on the right end in FIG. 5) of the main portion 18 is formed on the outside in the radial direction of the middle section in the axial direction of the ring 22.

After the outer column 10b that was obtained by formation of the main portion 18 is removed from the die 23, machining is performed for the inner diameter side of the ring 22 and a portion of the rear end section of the main portion 18 that adjoins the connecting section, and the inner diameter of the ring 22 and the portion of the rear end section of the main portion 18 that adjoins the connecting section is made to be equal to or greater than the inner diameter of a portion of the main portion 18 that is separated in the axial direction from the connecting section between the main portion 18 and the cylindrical member 19, and is equal to or less than the inner diameter of the cylindrical member 19. It is also possible to perform machining for the inner diameter side of the portion of the main portion 18 that is separated in the axial direction from the connecting section between the main portion 18 and the cylindrical member 19 as long as the inner diameter of the portion of the main portion 18 that is separated in the axial direction from this connecting section is within a range that is equal to or less than the inner diameter of the ring 22. By performing this kind of machining, the inner circumferential surface of through the inner column is inserted is uniform, and thus it is possible to stabilize the engagement force between the inner column and the main portion 18. Moreover, performing machining for the inner diameter side of the portion of the rear end section of the main portion 18 that adjoins the connecting section is convenient for simplifying processing, and the machining described above essentially be evaluated as being processing of only the inner diameter side of the ring 22.

In the case of the steering column of this example, of the outer column 10b of the steering column, it is possible to maintain the strength, while making the thickness of the rear end half where a steering lock apparatus 12 (see FIG. 28) is assembled thin. In other words, the rear half section of the outer column 10b is composed of the cylindrical member 19 that is made of an iron-based alloy for which it is easy to maintain strength. Therefore, it is possible to maintain the strength of the overall outer column 19b including the cylindrical member 19 even when, in order to install a lock unit 13 or key-lock collar 15, the thickness of the cylindrical member 19 of the rear half section is made thin up to 0.4 to 0.75, and preferably 0.5 to 0.7 times the thickness of the main portion 18, and even when, in order to insert a lock pin 16, a lock hole 17 is provided. On the other hand, because the portion of the steering column that includes the column member except for the cylindrical member 19 (the main portion 18 of the outer column, and the inner column) are made of a light metal alloy such as an aluminum alloy or a magnesium alloy, and because the thickness of the cylindrical member 19 is thin, there is no excessive increase in the weight of the overall steering column.

Moreover, the concave groove 20 that is formed around the outer circumferential surface of the cylindrical member 19 is made to engage with the protrusion 21 that is formed around the inner circumferential surface of the main portion 18, so it is possible to maintain the connecting strength in the axial direction between the main portion 18 and the cylindrical member 19. By increasing the contact surface area between the main portion 18 and the cylindrical member 19 in the circumferential direction as well, it is possible to increase the sliding resistance and thus to improve the connecting strength in the circumferential direction. Furthermore, as necessary, by forming an uneven surface in the circumferential direction on the bottom surface of the concave groove 20, or forming a through hole that opens in the bottom surface of the concave groove 20 and that is blocked by the ring 22, it becomes possible to more surely prevent relative rotation between the main portion 18 and the cylindrical member 19.

Figure 6:
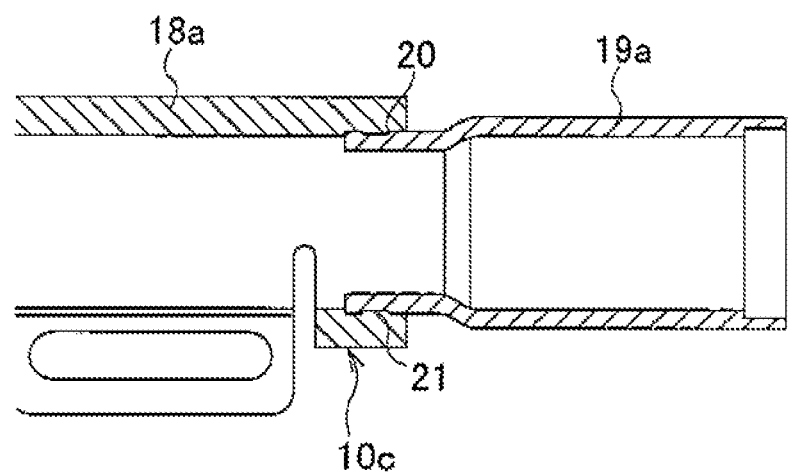
FIGS. 6A and 6B are cross-sectional view for explaining the problems with the manufacturing method when a ring is not used.
Figure 6:
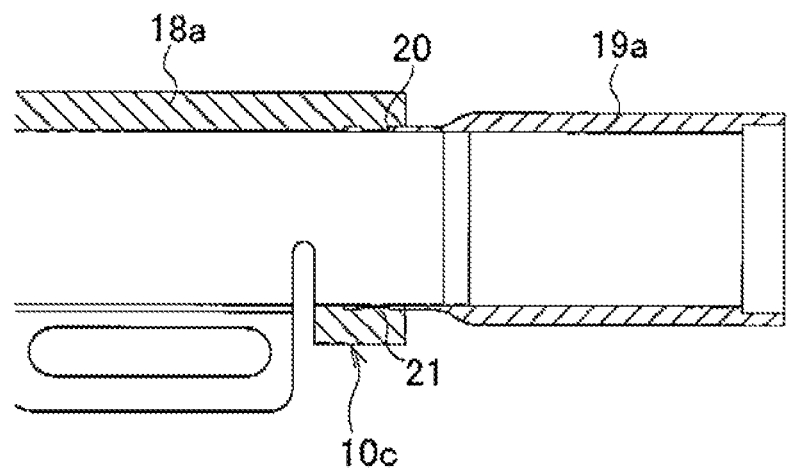

Furthermore, the ring 22 made from metal is fitted and fastened inside the connecting section between the main portion 18 and the cylindrical member 19, so it is possible to more effectively maintain the strength of this connecting section. The advantage of providing this ring 22 is explained in FIGS. 5A to 5C and FIGS. 6A and 6B. FIGS. 6A and 6B illustrates a reference example of manufacturing an outer column 10c wherein the main portion 18a and the cylindrical member 19a are connected in the axial direction based on only the engagement between the concave groove 21 and the protrusion 21 without the use of the ring 22 (see FIG. 1 to FIG. 5C), and furthermore the inner diameter of the cylindrical member 19a is equal to or greater than the inner diameter of the main portion 18a of the portion that is separated in the axial direction from the connecting section between the main portion 18a and the cylindrical member 19a. As explained using FIGS. 5A to 5C, when casting the main portion 18, 18a, in order to prevent molten metal from leaking out, an opposing surface for coming in contact with the stepped surface 31 of the core cylinder 28 is necessary. In this present invention, this opposing surface is the end surface of the ring 22, however, in the case of the reference example, is the end surface of the cylindrical member 19a.

In this reference example, under these kinds of conditions, as in the case illustrated in FIG. 5A, the main portion 18a is formed by casting so that the inner circumferential surface of the rear end section of the main portion 18a engages with the outer circumferential surface of the front end section of the cylindrical member 19a. Next, the inner diameter of the cylindrical member 19a is made to be equal to or greater than the inner diameter of the portion of the main portion 18 that is separated in the axial direction from the connecting section, so as illustrated in FIG. 6B, machining is performed on the inner diameter portion of the cylindrical member 19a in the connection section between the main portion 18a and the cylindrical member 19a. The thickness of the cylindrical member 19a is thin, so when machining is performed on the cylindrical member 19a, the thickness of the cylindrical member 19a becomes excessively thin in the connecting section, and it becomes impossible to maintain the connecting strength in this connecting section. On the other hand, in the case of the construction of this example, when performing machining on the portion of the inner diameter side of the connecting section, the portion that is machined is essentially the inner diameter side of the ring 22, and the cylindrical member 19 is not machined. The total thickness of the front end section of the cylindrical member 19 and the ring 22 when placed together as illustrated in FIG. 5A and FIG. 5B is sufficiently greater than the thickness of the front end section of the cylindrical member 19a illustrated in FIG. 6A. Therefore, as illustrated in FIG. 5C, even in the state where the ring 22 has been machined, it is possible to sufficiently maintain the thickness of this combined section, so it is also possible to sufficiently maintain the strength of the connecting section between the main portion 18 and the cylindrical member 19.

Moreover, machining is performed on the inner diameter side of the ring 22 to make the inner diameter of the ring 22 equal to or greater than the inner diameter of the portion of the main portion 18 that is separated in the axial direction from the connecting section between the main portion 18 and the cylindrical member 19, and equal to or less than the inner diameter of the cylindrical member 19. A cylindrical shaped inner column (not illustrated in the figures) is fitted inside the front end section (left end section) of this kind of outer column 10b in a state such that displacement in the axial direction is possible, to form an expanding and contracting steering column. The inner diameter of the outer column 10b increases from the front side (left side in FIG. 1) in the order from the main portion 18, the ring 22 and the cylindrical member 19, so when the outer column 10b displaces toward the front in the axial direction with respect to the inner column such as when adjusting the forward-backward position of the steering wheel, or during a secondary collision, the edge on the rear end of the inner column does not interfere with the portion that protrudes from the inner circumferential surface of the outer column 10b, so it is possible to prevent inhibition of displacement of the steering wheel in the forward direction.

The ring 22 is fitted inside the front end section of the cylindrical member 19, so when the main portion 18 is formed by feeding a molten light metal alloy into the die 23, the molten metal does not enter in the inner circumferential surface side of the cylindrical member 19, and thus it is possible to prevent the inner circumferential surface of the cylindrical member 19 from becoming rough due to the adherence of light metal alloy. Moreover, the stepped section 27 on the inner circumferential surface of the die 23 is located on the outside in the radial direction of the ring 22, so as molten metal is fed into the die 23, and pressure is applied to the die 23 from the top and bottom as illustrated by the arrows in FIG. 5A and the pressed molten metal is fed into the cavity of the die 23, the pressure that is applied to the outer circumferential surface of the front end section of the cylindrical member 19 is supported by the ring 22. Therefore, it is possible to prevent deformation of the cylindrical member 19 inward in the radial direction due to this pressure. In other words, when the stepped section 27 on the inner circumferential surface of the die 23 is located on the outside in the radial direction of the cylindrical member 19 in a position separated in the axial direction from the ring 22, the pressurized molten metal applies pressure inward in the radial direction to the outer circumferential surface of the middle section in the axial direction of the cylindrical member 19, and there is a possibility that the middle section in the axial direction of the cylindrical member 19 (portion separated in the axial direction from the portion where the ring 22 is inserted inside), however, with the construction of this example, it is possible to prevent this kind of deformation.

Example 2

Figure 7:
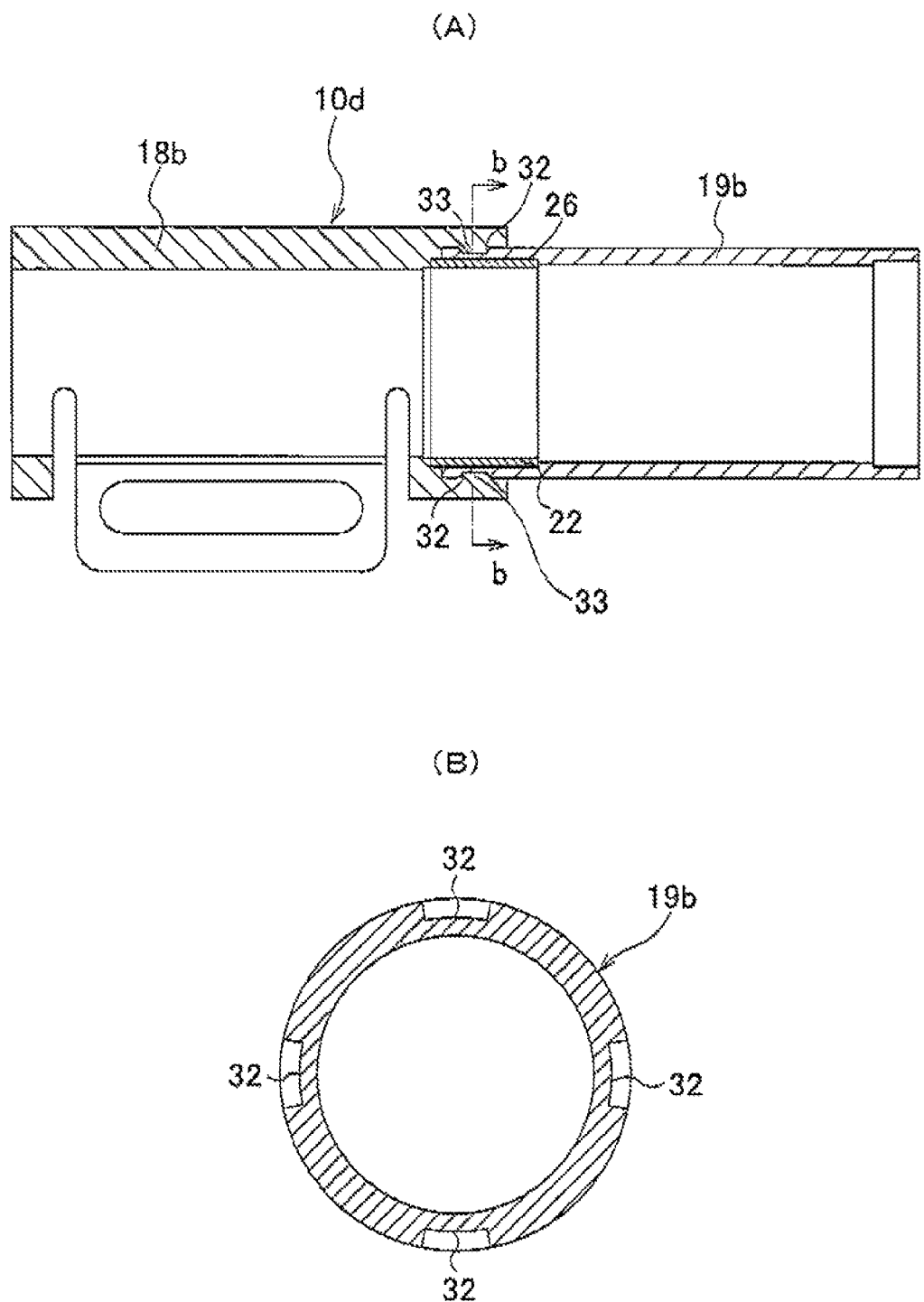
FIG. 7A is a drawing similar to FIG. 1, and illustrates a second example of an embodiment of the present invention.
FIG. 7B is a cross-sectional view of section "b-b" in FIG. 7A.
Figure 8:
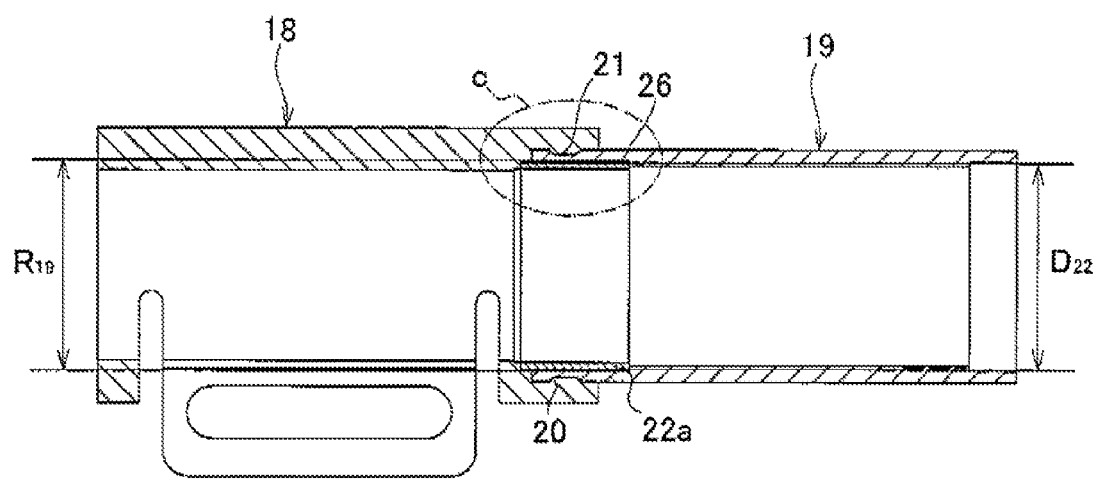
FIG. 8 is a drawing similar to FIG. 1, and illustrates a third example of an embodiment of the present invention.
Figure 9:
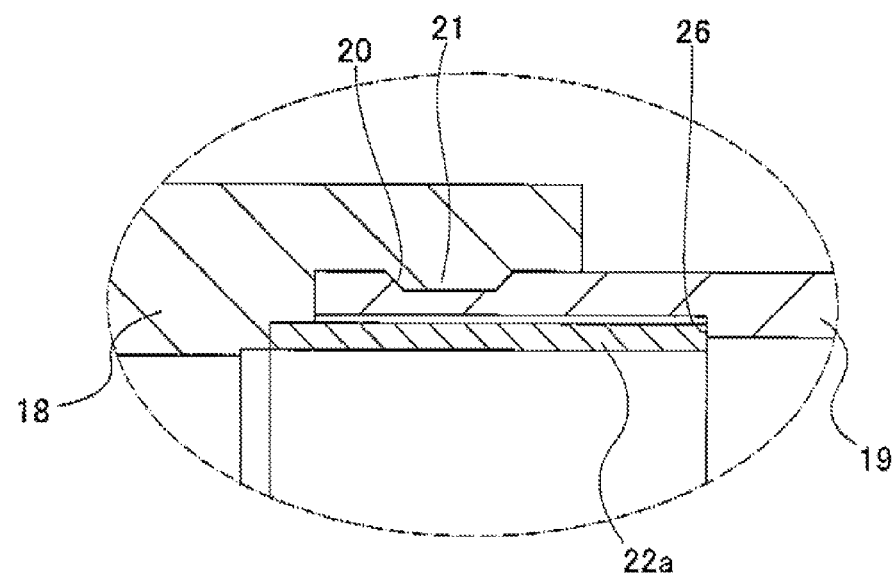
FIG. 9 is an enlarged view of part "c" in FIG. 8.
Figure 10:
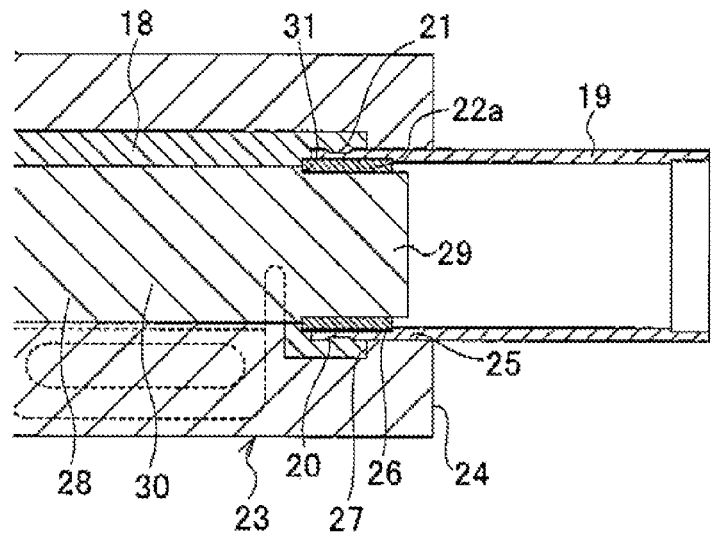
FIGS. 10A to 10C are drawings similar to FIGS. 5A to 5C, and illustrate the third example of an embodiment of the present invention.
Figure 10:
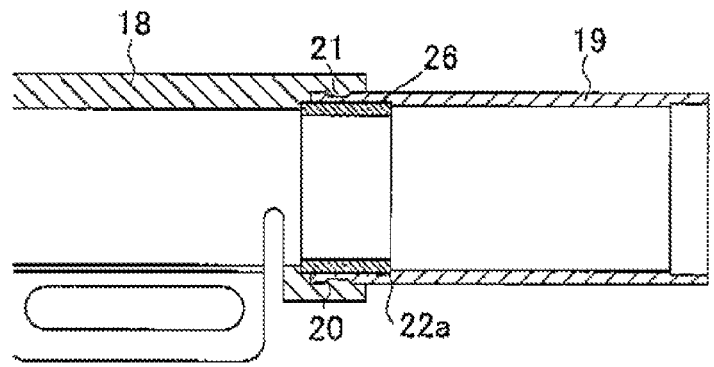
Figure 10:
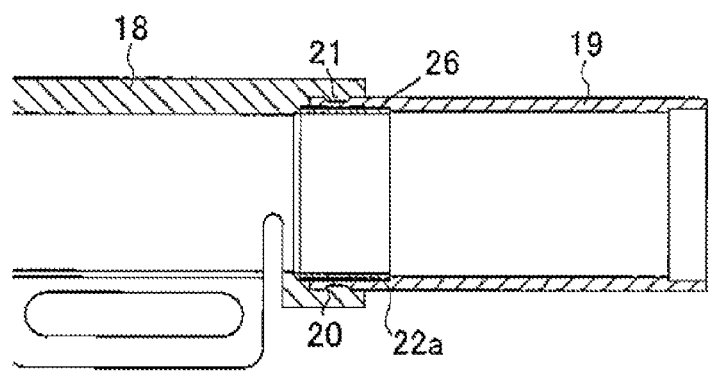

FIGS. 7A and 7B illustrate a second example of an embodiment of the present invention. In the case of this example, a concave section 32 is provided at one or a plurality of locations (four locations in the example in the figure) in the circumferential direction of the outer circumferential surface of the front end section of the cylindrical member 19b of the outer column 10d. Convex sections 33 are provided at a position on the inner circumferential surface of the rear end section of the main portion 18b that is aligned with the concave sections 32, and by the concave sections 32 engaging with the convex sections 33, the connecting strength in the axial direction and circumferential direction between the main portion 18 and the cylindrical member 19 is maintained. The construction and functions of the other parts of this second example are the same as in the first example of the embodiment.

Example 3

FIG. 8 to FIG. 10C illustrate a third example of an embodiment of the present invention. In this example, in the connecting section between the main portion 18 and the cylindrical section 19, a ring 22a fits inside the inner circumferential surface of the cylindrical member 19 with a loose fit. As exaggeratedly illustrated in FIG. 8 to FIG. 10C, the outer diameter $D_{22}$ of the ring 22a is a little smaller than the inner diameter $R_{19}$ of the front end section of the cylindrical member 19 ($D_{22} < R_{19}$), and a cylindrical shaped minute gap is formed between the outer circumferential surface of the ring 22a and the inner circumferential surface of the front end section of the cylindrical member 19. The thickness dimension in the radial direction of this minute gap is "$(R_{19}-D_{22})/2$" and is made as small as possible but is such that pressure is not necessary when the ring 22 is inserted into the front end section of the cylindrical member 19 and the ring 22 can be inserted with a loose fit; and when performing the work of feeding molten light metal alloy into the die 23, is such that the molten metal does not enter into this minute gap, and in the case the molten metal does enter this minute gap, it stops at a small amount.

In this example, a minute gap is provided between the outer circumferential surface of the ring 22a and the inner circumferential surface of the front end section of the cylindrical member 19, so it is possible to insert the ring 22a into the front end section of the cylindrical member 19 without pressure fitting, so it is possible to prevent a drop in the work efficiency due to providing a ring 22a. Moreover, it is possible to absorb deformation of the ring 22a due to thermal expansion when the temperature rises by this minute gap. Therefore, even when the ring 22a undergoes repeated thermal expansion or contraction, it is possible to prevent the occurrence of damage such as cracking of the ring 22a and the front end section of the cylindrical member 19 that exists around the ring 22a. The construction and functions of the other parts of this third example are the same as in the first example of the embodiment.

Example 4

Figure 11:
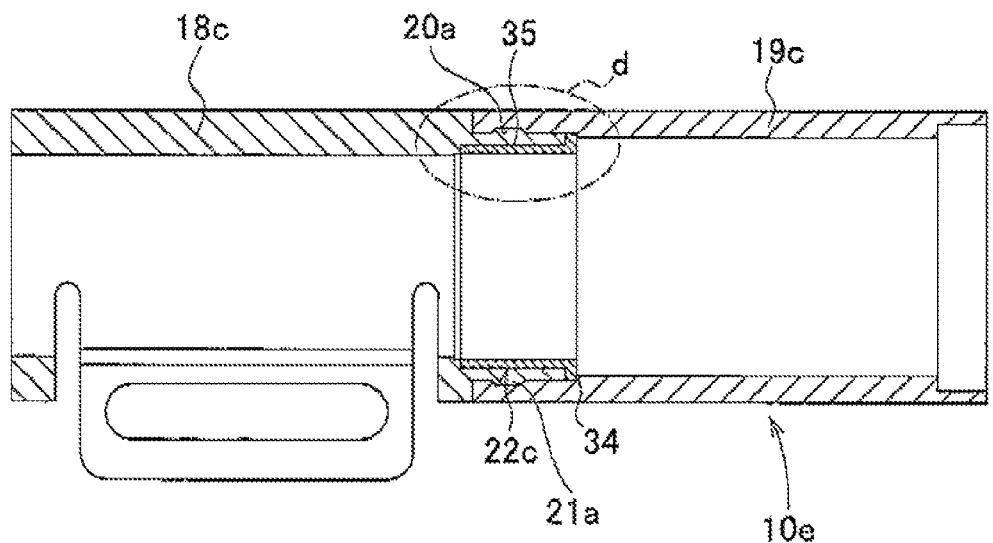
FIG. 11 is a drawing similar to FIG. 1, and illustrates a fourth example of an embodiment of the present invention.
Figure 12:
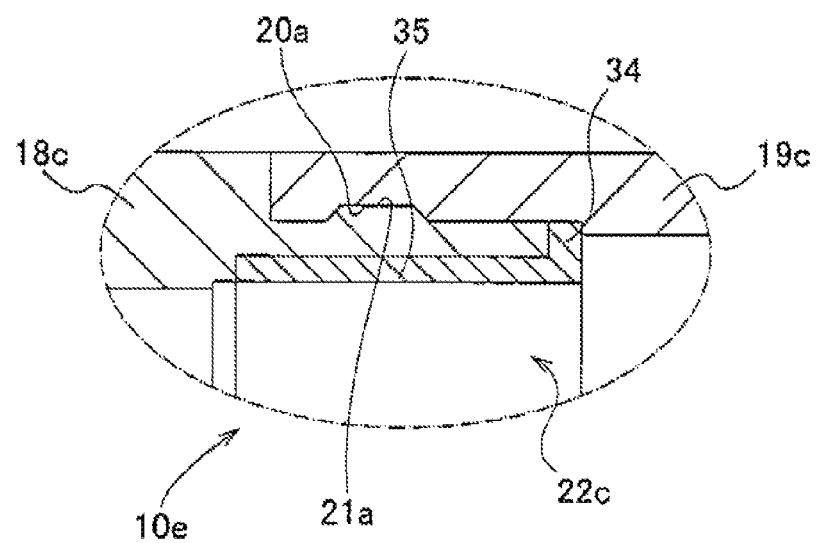
FIG. 12 is an enlarged view of part "d" in FIG. 11.

FIG. 11 and FIG. 12 illustrate a fourth example of an embodiment of the present invention. In this example, the outer diameter of the main portion 18c and the outer diameter of the cylindrical member 19c are the same size, and the outer column 10e is such that the front end section of the cylindrical member 19c fits onto the rear end section of the main portion 18c. In order for this, a flange section 34 that protrudes outward in the radial direction is provided on the rear end section of the a ring 22b, and the outer circumferential surface of the flange section 34 is fitted and fastened inside the inner diameter portion of the front end section of the cylindrical member 19c. The rear end section of the main portion 18c is held between a small-diameter section 35 that is provided from the middle section to the front end section of the ring 22c and the front end section of the cylindrical member 19c, and the main portion 18c and the cylindrical member 19c are connected in the axial direction. As a result, in this example, the inner diameter of the cylindrical member 19c can be larger than the inner diameter of the main portion 18c, and a space on the inner diameter side of the cylindrical member 19c for providing a key-lock collar 13 (see FIG. 28) can be easily maintained. In this example, a concave groove 20a that is formed around the inner circumferential surface of the cylindrical member 19 engages with a protrusion 21a that is formed around the outer circumferential surface of the main portion 18, so it is possible to maintain the connecting strength in the axial direction between the main portion 18 and the cylindrical member 19. The construction and functions of the other parts of this fourth example are the same as in the first example of the embodiment.

Example 5

Figure 13:
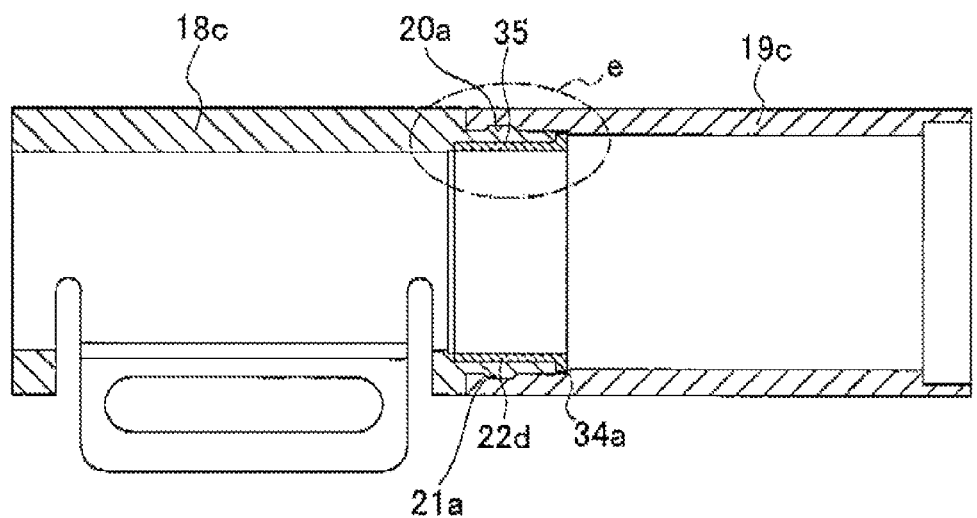
FIG. 13 is a drawing similar to FIG. 1, and illustrates a fifth example of an embodiment of the present invention.
Figure 14:
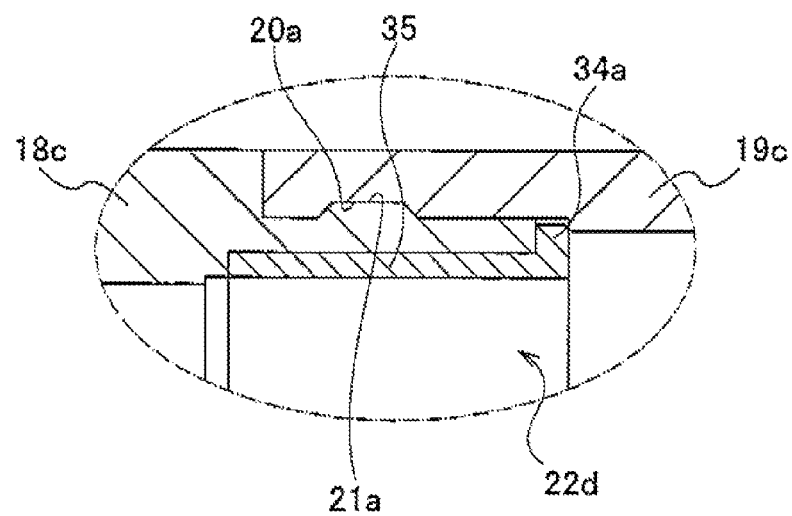
FIG. 14 is an enlarged view of part "e" in FIG. 13.
Figure 15:
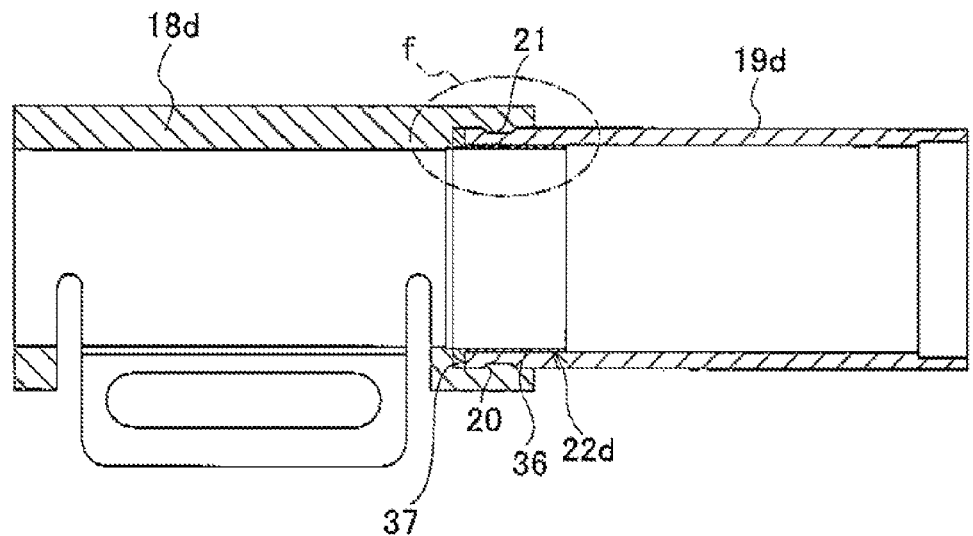
FIG. 15 is a drawing similar to FIG. 1, and illustrates a sixth example of an embodiment of the present invention.
Figure 16:
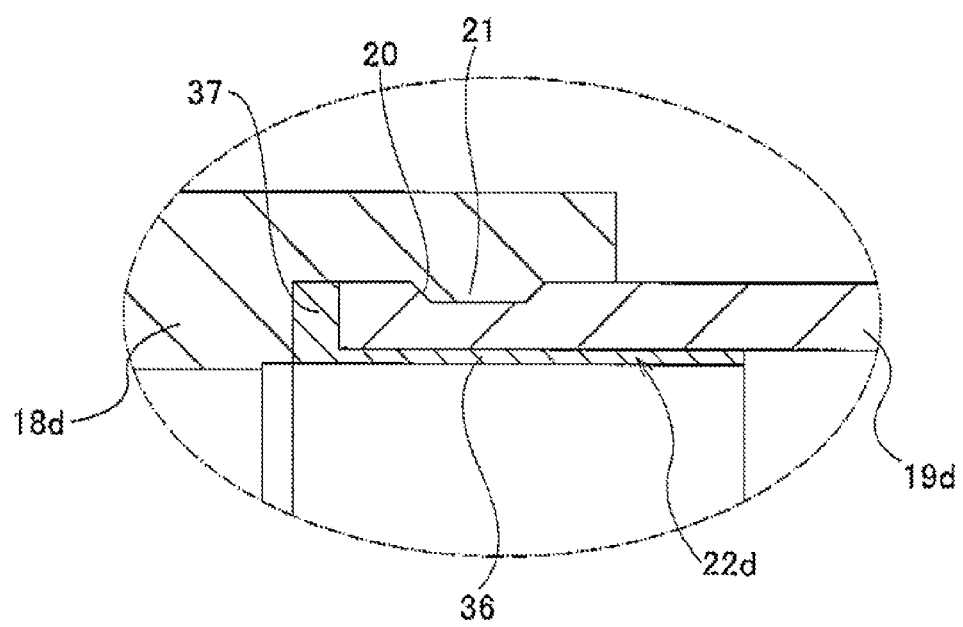
FIG. 16 is an enlarged view of part "f" in FIG. 15.
Figure 17:
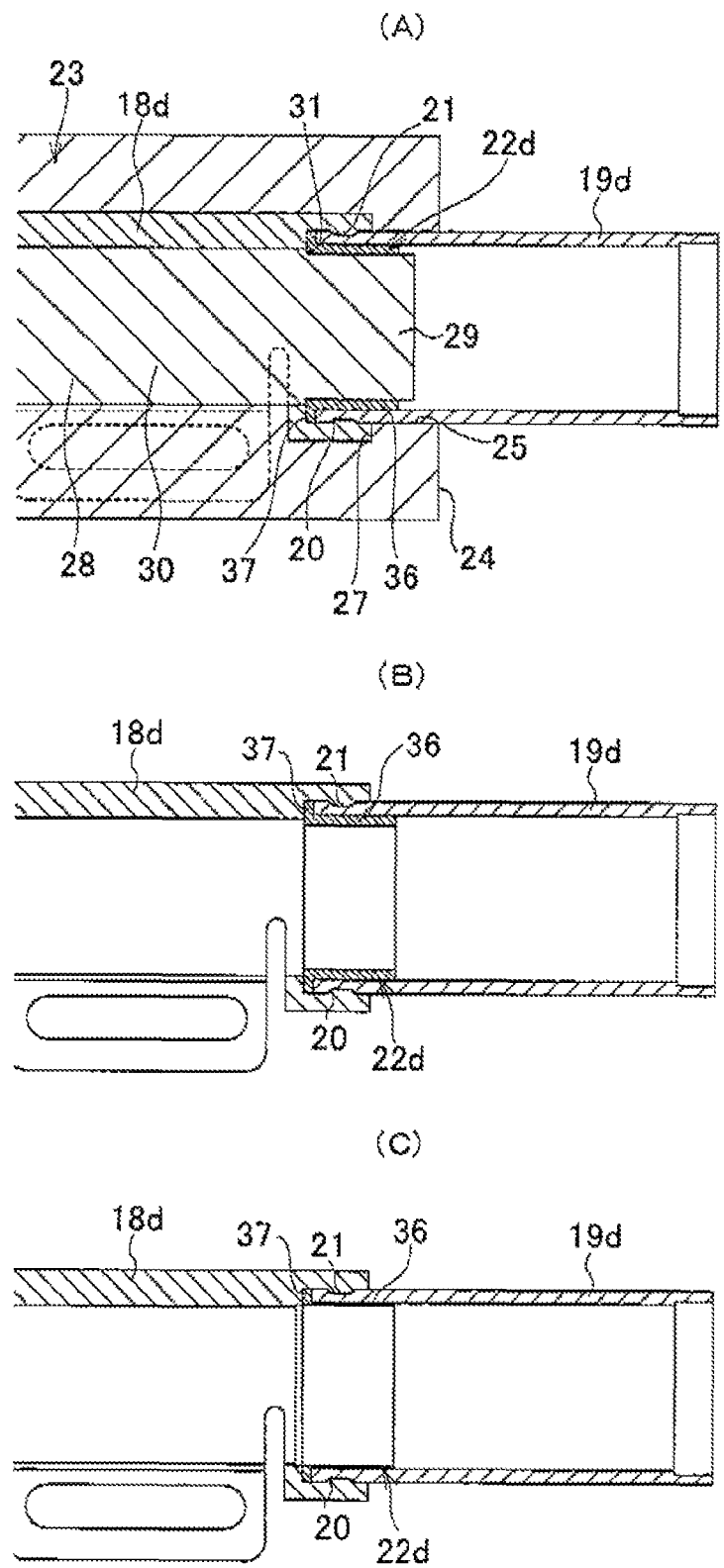
FIGS. 17A to 17C are drawings similar to FIGS. 5A to 5C, and illustrate the sixth example of an embodiment of the present invention.
Figure 18:
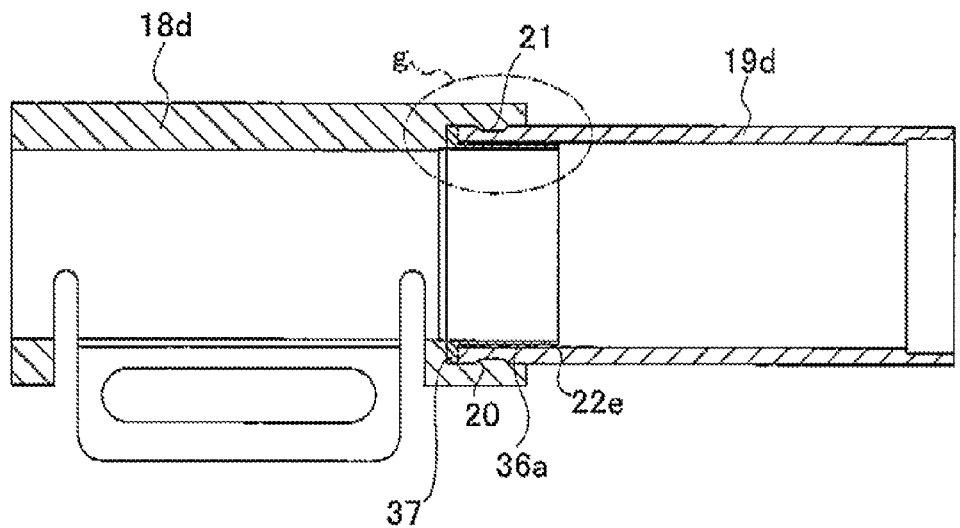
FIG. 18 is a drawing similar to FIG. 1, and illustrates a seventh example of an embodiment of the present invention.
Figure 19:
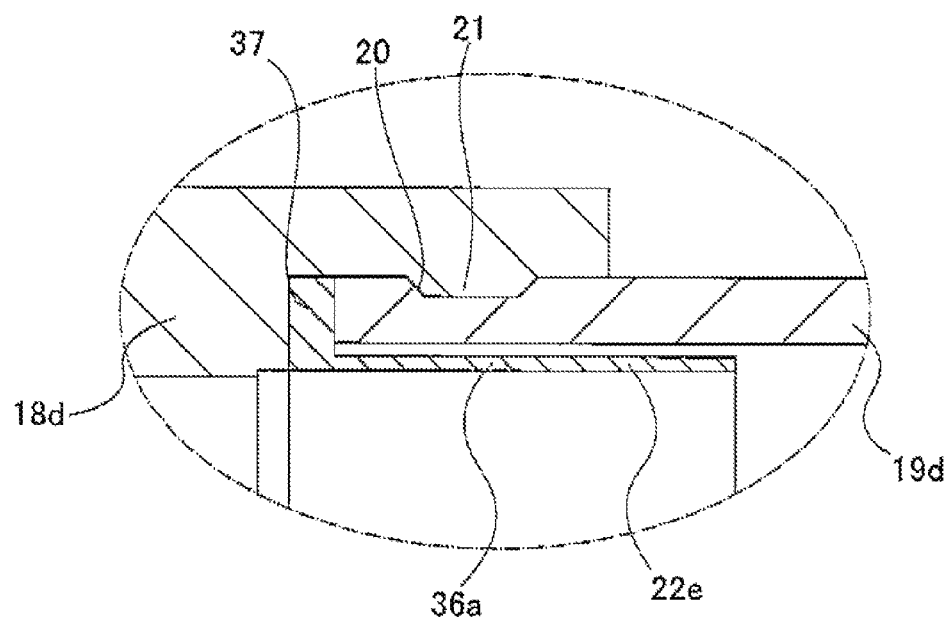
FIG. 19 is an enlarged view of part "g" in FIG. 18.
Figure 20:
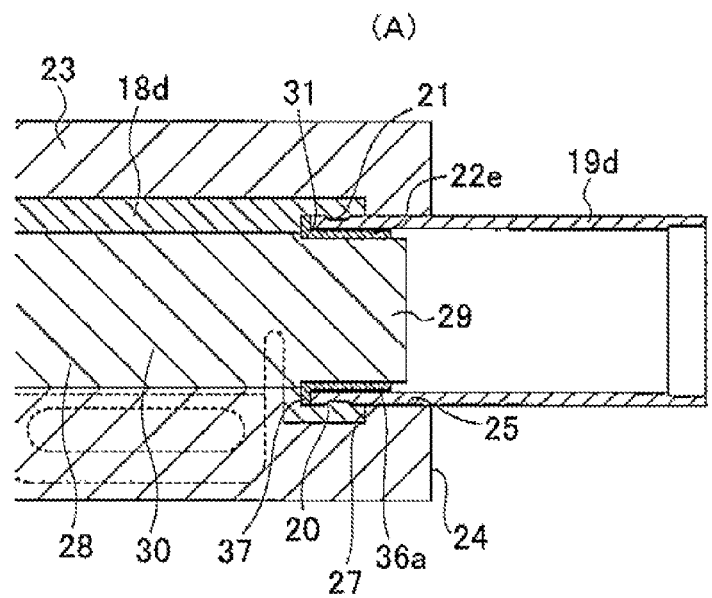
FIGS. 20A to 20C are drawings similar to FIGS. 5A to 5C, and illustrate the seventh example of an embodiment of the present invention.
Figure 20:
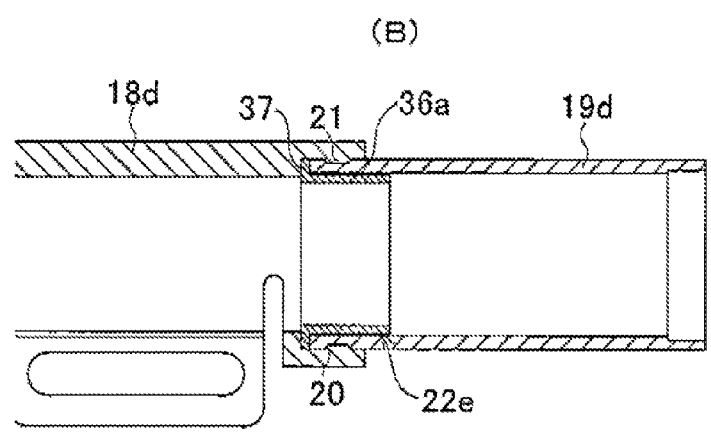
Figure 20:
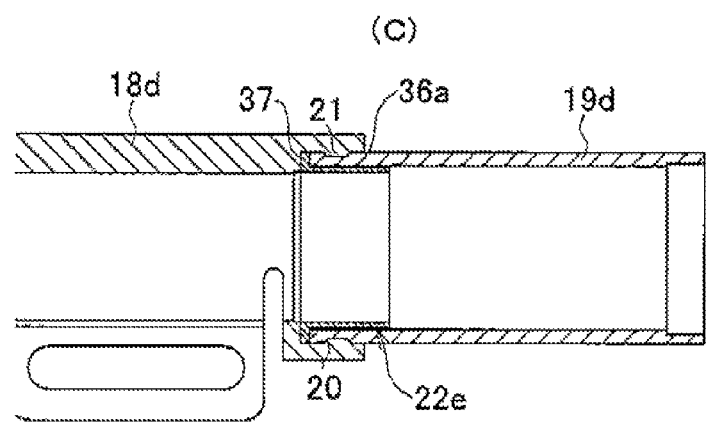

FIG. 13 and FIG. 14 illustrate a fifth example of an embodiment of the present invention. This example is a variation of the fourth example of the embodiment. In other words, the outer circumferential surface of a flange section 34a that is provided on the rear end section of the ring 22c so as to protrude outward in the radial direction is fitted and fastened inside the inner diameter portion of the front end section of the cylindrical member 19d with a loose fit. A minute gap is formed between the outer circumferential surface of the flange section 34a and the inner circumferential surface of the cylindrical member 19c. As a result, it is possible to insert the ring 22c into the front end section of the cylindrical member 19c without a pressure fit. The construction and functions of the other parts of this fifth example are the same as in the fourth example of the embodiment.

Example 6

FIG. 15 to FIG. 17C illustrate a sixth example of an embodiment of the present invention. In this example, a cylindrical section 36 that is formed from the middle section to the rear end section of a ring 22d made from metal is fitted and fastened inside the connecting section between the main portion 18d and the cylindrical member 19d. An outward facing flange-shaped flange section 37 that protrudes outward in the radial direction is formed on the front end section of the ring 22d, and the surface on the rear side (surface on the right side in FIG. 15 to FIG. 17C) of the flange section 37 comes in contact with the front end surface (left end surface in FIG. 15 to FIG. 17C) of the cylindrical member 19d.

With the steering column of this example, when manufacturing the steering column, when pressure fitting the ring 22d into the connecting section between the main portion 18d and the cylindrical member 19d, it is possible to stop the ring 22d at the proper position, and easily prevent the ring 22d from going all the way to the back side of the cylindrical member 19d. In other words, when manufacturing the steering column of this example, the cylindrical section 36 of the ring 22d fits inside the front end section of the cylindrical member 19d that protrudes into the die 23 with an interference fit beforehand. When pressure fitting the cylindrical section 36 toward the back side of the cylindrical member 19d, the surface on the rear side (surface on the right side in FIGS. 17a to 17C) of the flange section 27 of the ring 22d comes in contact with the front end surface (left side surface in FIGS. 17A to 17C) of the cylindrical member 19d, and the ring 22d stops at the proper position without advancing any further toward the back side (right side in FIGS. 17A to 17C) of the cylindrical member 19d. When this flange section 37 is not provided, in order to prevent the ring from going all the way to the back side of the cylindrical member, it is necessary to take measures such as forming a stepped section around the inner circumferential surface of the middle section in the axial direction of the cylindrical member such that the inner diameter of the portion of the cylindrical member except the front end section becomes smaller than the outer diameter of the ring. As a result, the cost of manufacturing the steering column increases, and there is a possibility that the thickness of the portion of the cylindrical member except the front end section will become thick. The construction and functions of the other parts of this sixth example are the same as in the first example.

Example 7

FIG. 18 to FIG. 20C illustrate a seventh example of an embodiment of the present invention. This example is a variation of the sixth example of the embodiment. In other words, as exaggeratedly illustrated in FIG. 18 to FIG. 20C, the outer diameter of the cylindrical section 36a of the ring 22e is a little smaller than the inner diameter of the front end section of the cylindrical member 19d, and a minute gap is formed between the outer circumferential surface of the cylindrical section 36a and the inner circumferential surface of the front end section of the cylindrical member 19d. Therefore, it is possible to obtain the same effect as in the third example of the embodiment. The construction and functions of the other parts of this seventh example are the same as in the sixth example of the embodiment.

Example 8

Figure 21:
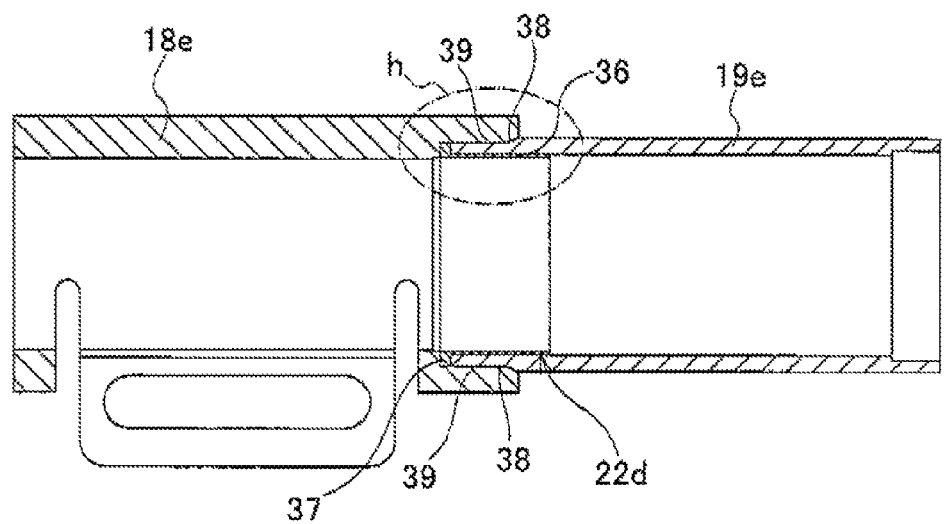
FIG. 21 is a drawing similar to FIG. 1, and illustrates an eighth example of an embodiment of the present invention.
Figure 22:
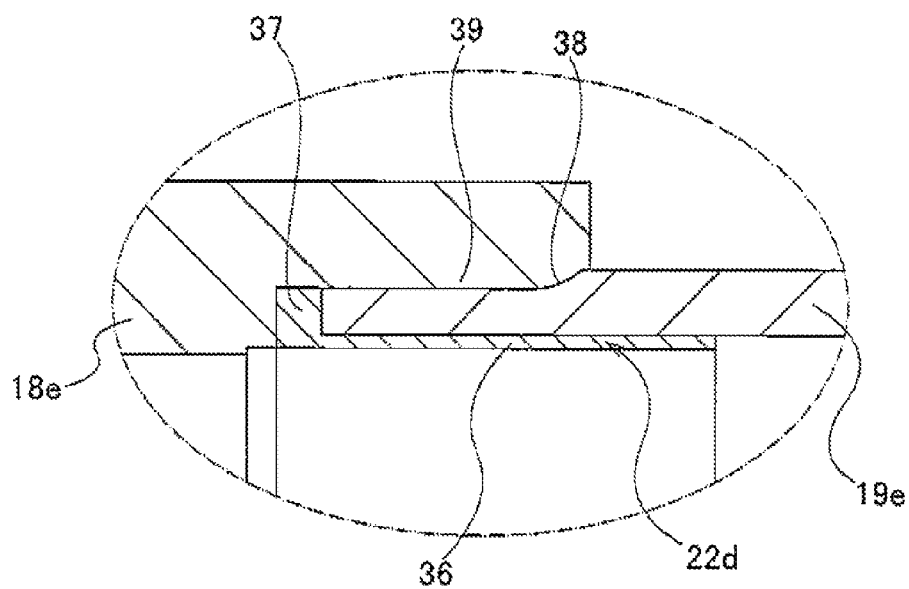
FIG. 22 is an enlarged view of part "h" in FIG. 21.
Figure 23:
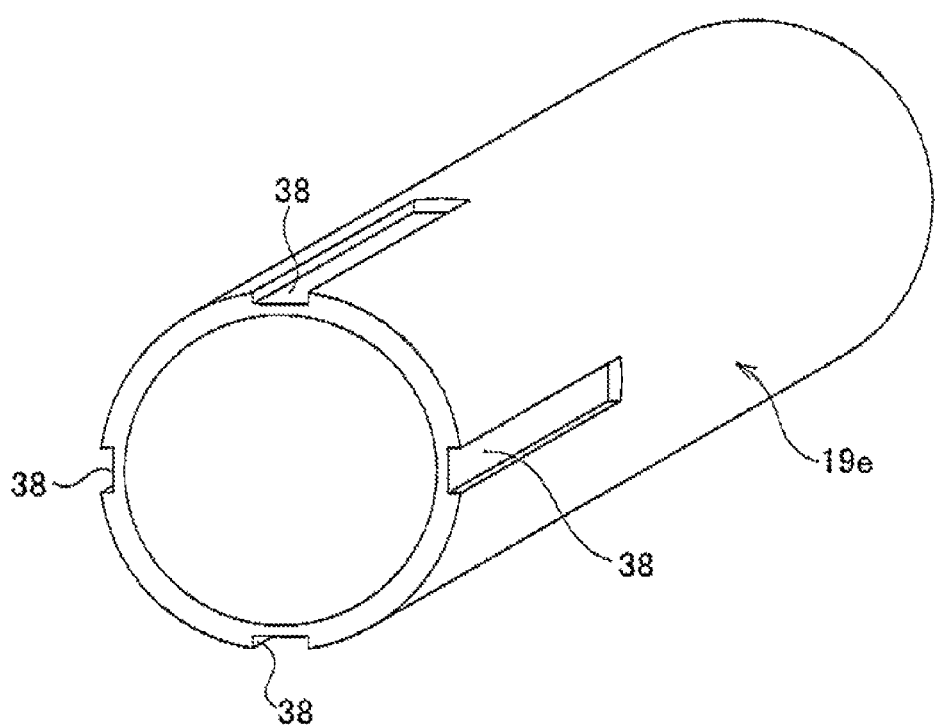
FIG. 23 illustrates the eighth example of an embodiment of the present invention, and is a perspective view of a removed cylindrical member.

FIG. 21 to FIG. 23 illustrate an eighth example of an embodiment of the present invention. In this example, concave grooves 38 that are long in the axial direction and that are open on the front end surface (left end surface in FIG. 21 and FIG. 22) are formed at one or a plurality of locations (four locations in the example in the figures) in the circumferential direction on the outer circumferential surface of the front end section of the cylindrical member 19e. Protrusions 39 that are formed on the inner circumferential surface of the rear end section of the main portion 18e are made to engage with the concave grooves 38, connecting in the axial direction the main portion 18e and the cylindrical member 19e.

The concave grooves 38 are open on the front end surface (left end surface in FIG. 21 to FIG. 22) of the cylindrical member 19e, so when feeding molten light metal alloy to the back end section of the die 23 (see FIGS. 5A to 5C) and forming the main portion 18e, part of the molten light metal alloy is fed into the concave grooves 28, so it is possible to maintain the engagement strength between the concave grooves 38 and the protrusions 39. Furthermore, by increasing the surface area of contact in the axial direction between the main portion 18e and the cylindrical member 19e, it is possible to increase the sliding resistance and thus improve the connecting strength in the axial direction. Moreover, when necessary, by forming an uneven surface in the axial direction on the bottom surface of the concave grooves 38, or forming through holes that are open on the bottom surface of the concave grooves 38 that are blocked by the ring 22d, it is possible to more surely improve the connecting strength in the axial direction between the main portion 18e and the cylindrical member 19e. The construction and functions of the other parts of this eighth example are the same as in the first example of the embodiment.

Example 9

Figure 24:
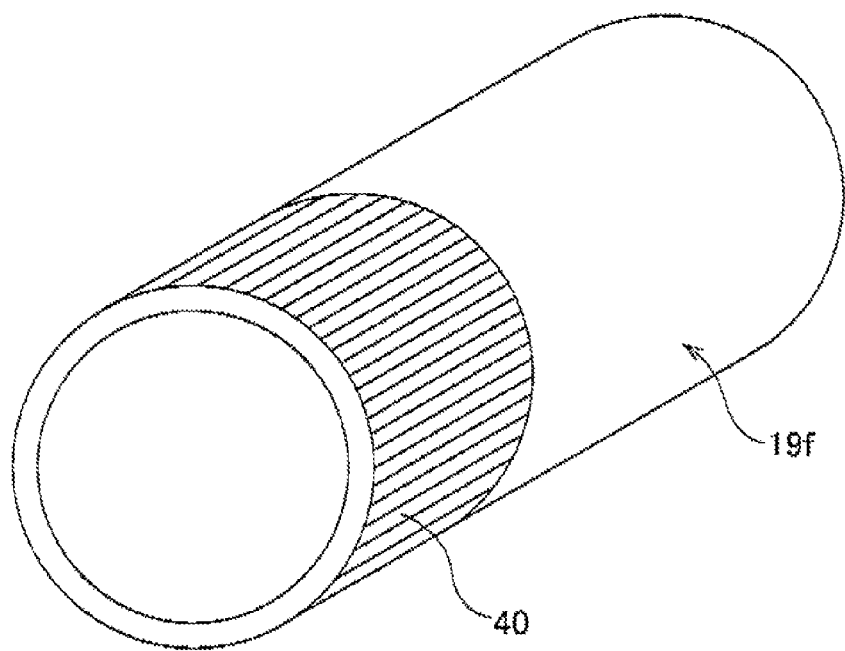
FIG. 24 is a drawing similar to FIG. 23, and illustrates a ninth example of an embodiment of the present invention.

FIG. 24 illustrates a ninth example of an embodiment of the present invention. In this example, an uneven section 40 that is formed by forming a plurality of minute concave grooves by knurling on the outer circumferential surface on the tip end section of the cylindrical member 19f as illustrated by the plurality of straight lines in FIG. 24. When feeding molten light metal alloy into the die 23 (see FIG. 5) and forming the main portion, by feeding part of the molten metal into the uneven section 40, a plurality of minute protrusions are formed on the inner circumferential surface on the tip end section of the main portion. The uneven section 40 that is formed by knurling can be either straight knurls or twill knurls. In the case of forming twill knurls on the uneven section 40, it is possible to maintain the connecting strength in the axial direction in addition to the circumferential direction due to engagement between the minute concave sections and the minute protrusions. The construction and functions of the other parts of this ninth example are the same as in the first example of the embodiment.

Example 10

Figure 25:
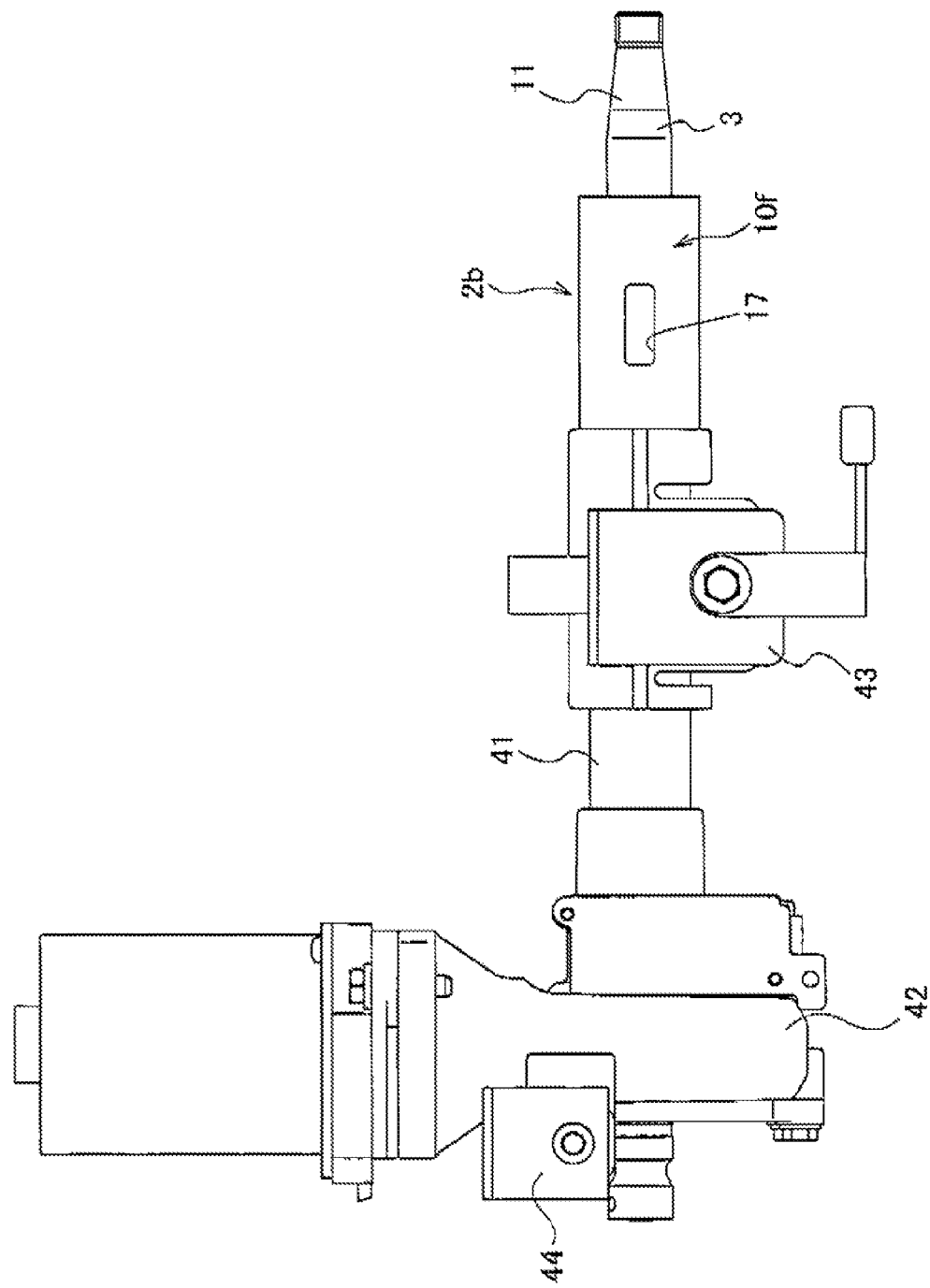
FIG. 25 illustrates a tenth example of an embodiment of the present invention, and is a side view illustrating a steering apparatus.
Figure 26:
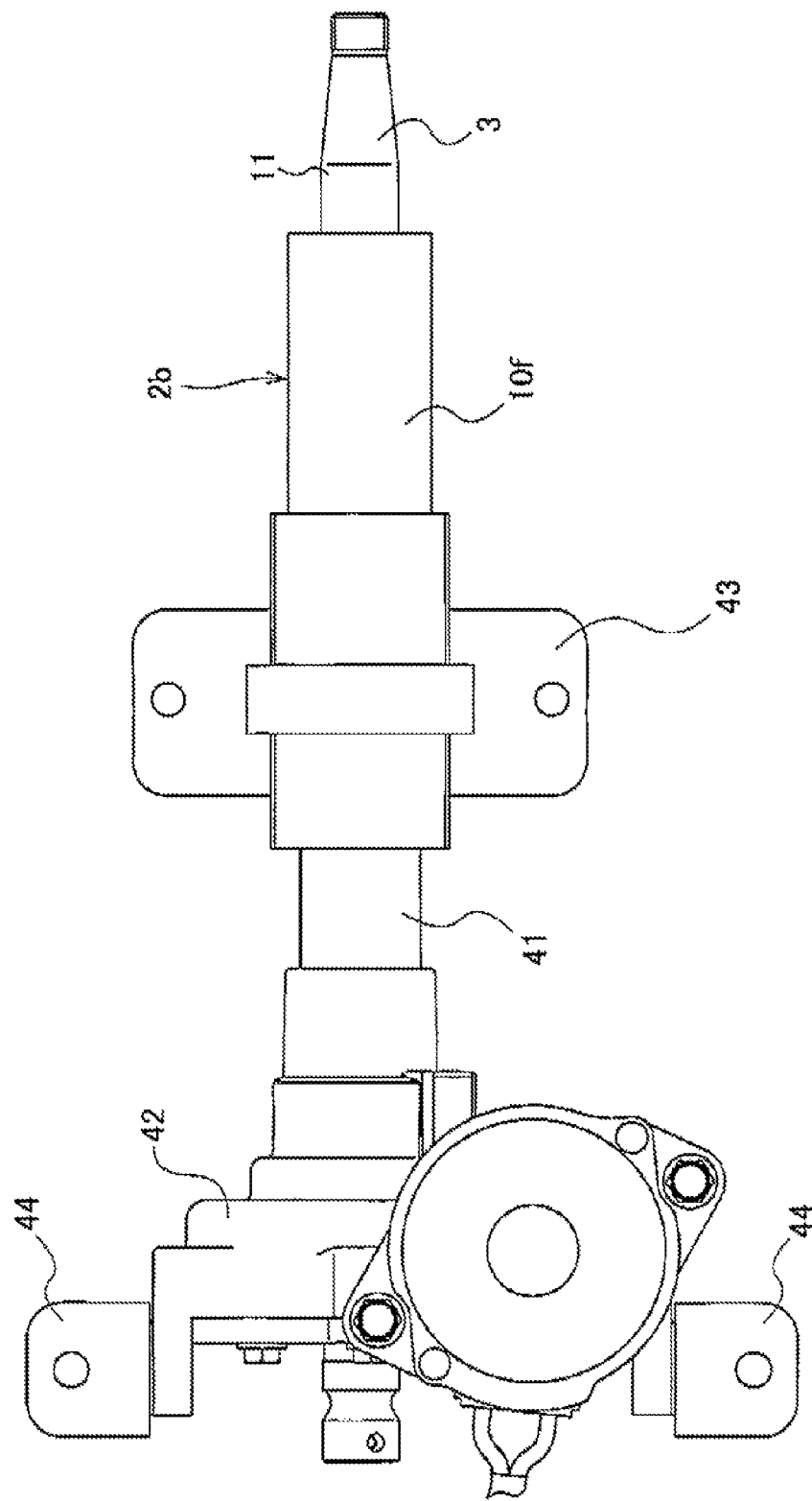
FIG. 26 is a top view as seen from above in FIG. 25.
Figure 27:
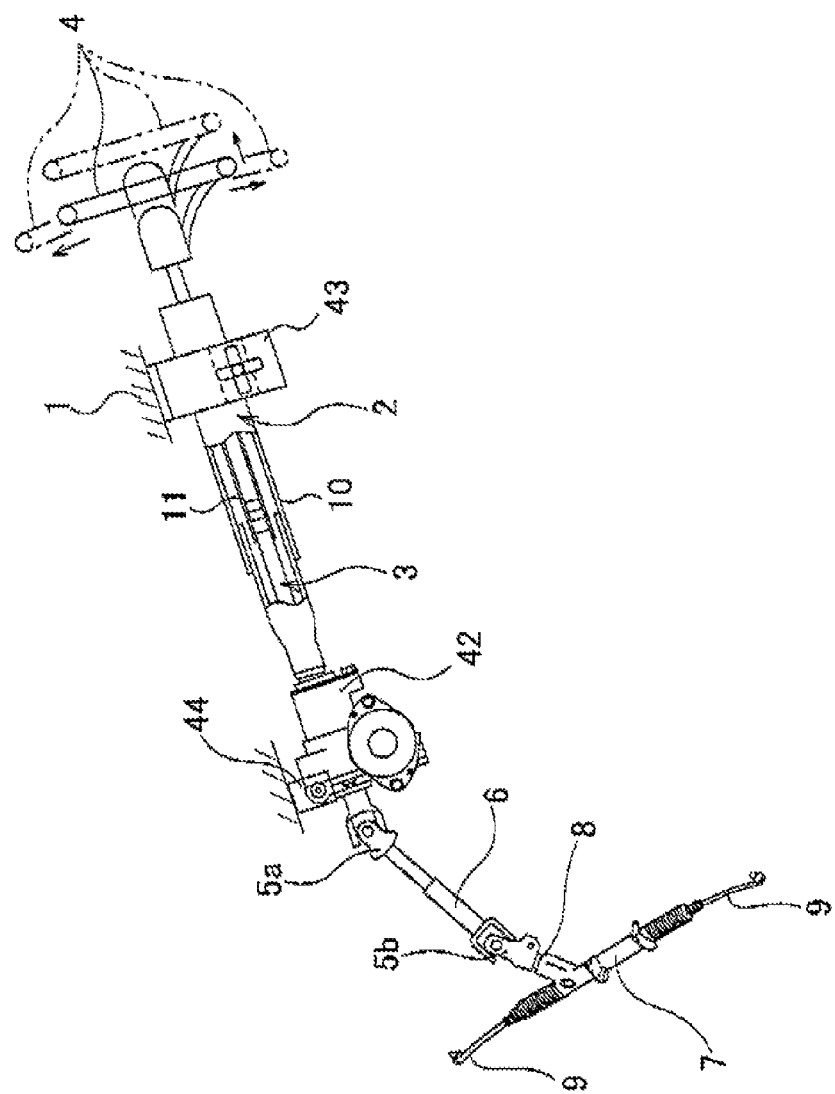
FIG. 27 illustrates an example of a conventionally known steering apparatus, and is a perspective view with part removed.

FIG. 25 and FIG. 26 illustrate a tenth example of an embodiment of the present invention. This example is an example of a steering apparatus of the present invention. This steering apparatus is a shock absorbing steering apparatus that comprises a telescopic mechanism. In this steering apparatus, the rear end section of an inner column 41 fits inside the front end section of an outer column 10f in a state such that the outer column 10f and the inner column 41 displace in the axial direction with respect to each other. A housing 42 for housing a reduction gear of an electric power-steering apparatus is connected and fastened to the front end section of the inner column 41. This kind of steering column 2b is supported by the vehicle body by connecting and fastening a rear side bracket 43 that supports the outer column 10f and front side brackets 44 that provided on both the left and right sides of the front end section of the housing 42 to the vehicle body. In this example, a steering column 2b that includes any one of the column members of the first through ninth examples of an embodiment of the present invention is used as the outer column 10f of the steering column 2b.

Figure 28:
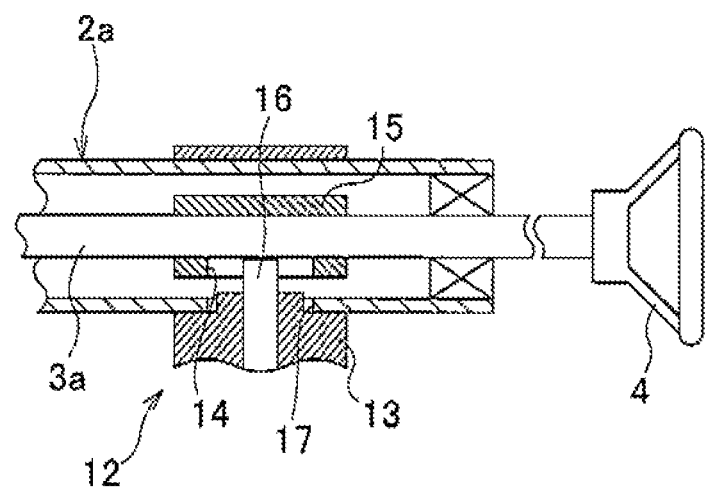
FIG. 28 is a cross-sectional view of an example of conventional construction of a steering lock apparatus.
Figure 29:
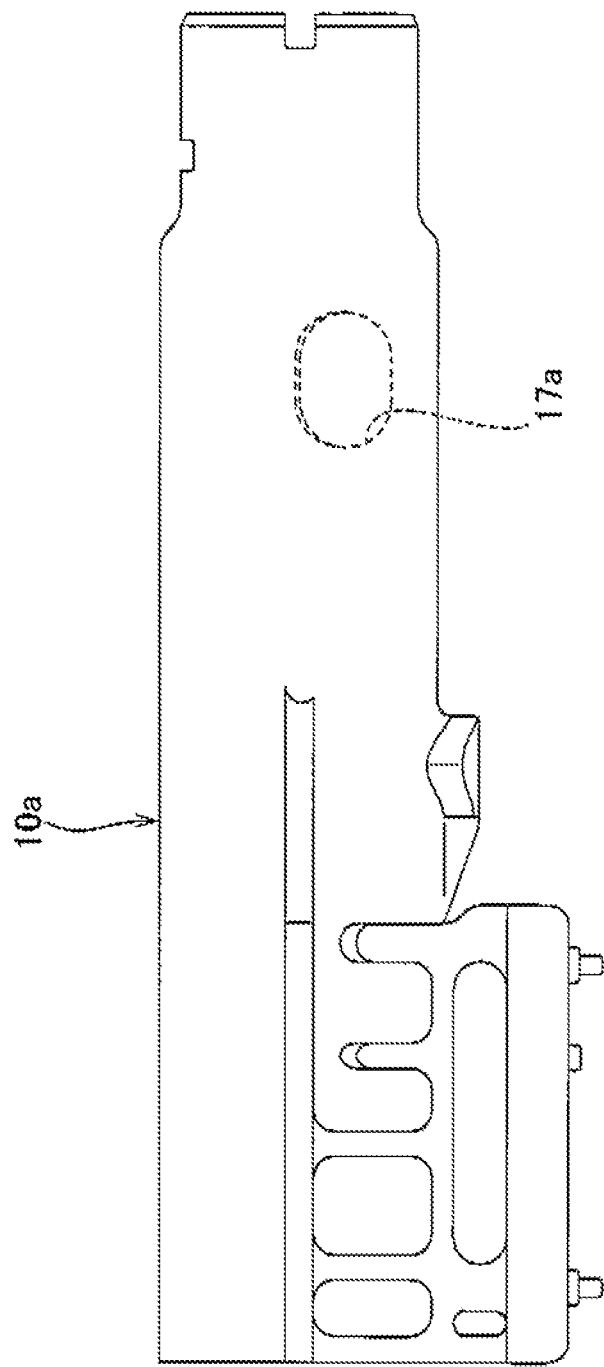
FIG. 29 is a side view illustrating an example of conventional construction of a steering column that is provide with a lock through hole.

In the steering apparatus of this example, a steering lock apparatus as illustrated in FIG. 28 is assembled. When operating the steering lock, the steering shaft 3 is essentially prevented from rotating on the inside of the steering column 2b. Being essentially prevented means that when an engaging concave section 14 is engaged with the tip end section of a locking pin 16 (see FIG. 30), and the steering wheel 4 (see FIG. 29) is rotated with a specified force or greater (a force that exceeds a value specified by key-lock regulations), the steering shaft 3 is allowed to rotate not only with respect to the key-lock collar 15, but also with respect to the steering column 2b. However, the steering shaft 3 does not rotate when the steering wheel 4 is operated with a force in normal operating posture for applying a desired steering angle to the steered wheels. The column member of the present invention can be applied not only to the outer column of a steering column having a telescopic mechanism as described above, but also to a steering wheel that does not have a telescopic mechanism.

EXPLANATION OF REFERENCE NUMBERS

1 Vehicle body
2, 2a, 2b Steering column
3, 3a Steering shaft
4 Steering wheel
5a, 5b Universal joint
6 Intermediate shaft
7 Steering gear unit
8 Input shaft
9 Tie rod
10, 10a to 10f Outer column
11 Outer tube
12 Steering lock apparatus
13 Lock unit
14 Engaging concave section
15 Key-lock collar
16 Locking pin
17, 17a Lock through hole
18, 18a to 18e Main portion
19, 19a to 19f Cylindrical member
20, 20a Concave groove
21, 21a Protrusion
22, 22a to 22e Ring
23 Die
24 Outside surface
25 Insertion hole
26 Stepped section
27 Stepped section
28 Core cylinder
29 Tip end section
30 Base end section
31 Stepped surface
32 Concave section
33 Convex section
34, 34a Flange section
35 Small-diameter section
36, 36a Cylindrical section
37 Flange section
38 Concave groove
39 Protrusion
40 Uneven section
41 Inner column
42 Housing
43 Rear side bracket
44 Front side bracket

What is claimed is:

1. A steering column having a cylindrical shape as a whole and comprising a column member;
the column member having:
a main portion that is made using a light metal alloy;
a cylindrical member that is made using an iron-based alloy, and that is connected to an end section on one side of the main portion in the axial direction with an end section on the other side of the cylindrical member fitted with the end section on the one side of the main portion; and
a ring made using a metal material that is fitted and fastened inside the inner diameter side of a connecting section between the main portion and the cylindrical member.

2. The steering column according to claim 1, wherein the inner diameter of the ring is equal to or greater than the inner diameter of a portion of the main portion that is separated in the axial direction from the connecting section, and is equal to or less than the inner diameter of the cylindrical member.

3. The steering column according to claim 1, wherein the ring is made using a light metal alloy.

4. The steering column according to claim 1, wherein the end section on the other side of the cylindrical member is fitted into the end section on the one side of the main portion, and the ring is fitted and fastened into the inner circumferential surface of the connecting section between the main portion and the cylindrical member.

5. The steering column according to claim 1, wherein the end section on the other side of the cylindrical member is fitted onto the end section on the one side of the main portion, and the ring is fitted and fastened into the inner circumferential surface of the connecting section between the main portion and the cylindrical member.

6. The steering column according to claim 1, wherein the outer diameter of the ring is smaller than the inner diameter of the connecting section between the main portion and the cylindrical member, and the ring is fitted and fastened inside the inner diameter side of the connecting section between the main portion and the cylindrical member in a state wherein a gap is formed between the outer circumferential surface of the ring and the inner circumferential surface of the end section on the other side of the cylindrical member.

7. The steering column according to claim 4, wherein the ring is positioned in the axial direction so that an end edge on the one side of the main portion is located on the outside in the radial direction of the middle section in the axial direction of the ring.

8. The steering column according to claim 4, wherein an outward facing flange-shaped flange section that protrudes outward in the radial direction is provided on an end section on the other side of the ring, and a side surface on the one side of this flange section comes in contact with an end surface on the other side of the cylindrical member.

9. The steering column according to claim 1, wherein a lock through hole of a steering lock apparatus is provided at one location of the middle section in the axial direction of the cylindrical member.

10. A manufacturing method for a steering column that is for manufacturing the steering column described in claim 1, comprising the steps of:
fitting the ring into the end section on the other side of the cylindrical member;
inserting the end section on the other side of the cylindrical member into an insertion hole that is open on an end surface of the one side of a die, such that the end section on the other side of the cylindrical member protrudes into the die;
inserting an end section on the one side of a core cylinder through the ring; and
forming the main portion by feeding molten light metal alloy into the die.

11. The manufacturing method for a steering column according to claim 10,
wherein the main portion is formed so that the inner diameter of the ring is smaller than the inner diameter of the main portion, and the inner diameter of the cylindrical member is larger than the inner diameter of the portion of the main portion that is separated in the axial direction from the connecting section, and
wherein, after the main portion is formed, the method comprises further a step of performing a machining on a portion on the inner diameter side of the ring so as to make the inner diameter of this ring equal to or greater than the inner diameter of the portion of the main portion that is separated in the axial direction from the connecting section, and equal to or less than the inner diameter of the cylindrical member.

12. The manufacturing method for a steering column according to claim 10, wherein the outer diameter of the ring is made to be smaller than the inner diameter of the end section on the other side of the cylindrical member that will become the connecting section between the main portion and the cylindrical member, and in a state wherein a gap is formed between the outer circumferential surface of the ring and the inner circumferential surface of the end section on the other side of the cylindrical member, the ring is fitted and fastened into the end section on the other side of the cylindrical member.

13. The manufacturing method for a steering column according to claim 10, wherein a die having a stepped section on the inner diameter side of the portion near the end section on the one side is used as the die, and with the end section on the other side of the cylindrical member protruding into the die, the stepped section of this die is placed on the outside in the radial direction around the middle section in the axial direction of the ring, and by feeding part of the molten metal toward this stepped section, the end edge of the main portion is formed.

14. The manufacturing method for a steering column according to claim 10, wherein a ring that is provided with an outward facing flange-shaped flange section that protrudes outward in the radial direction in an end section on the other side thereof is used as the ring, and a side surface on the one side of this flange section comes in contact with an end surface of the other side of the cylindrical member, and the end section on the other side of this ring protrudes into the die.

15. A steering apparatus comprising;
   a steering column that is supported by a vehicle body;
   a steering shaft that is supported on the inner diameter side of the steering column so as to be able to rotate; and
   a steering lock apparatus that is provided between the steering column and the steering shaft and that essentially prevents the steering shaft from rotating inside the steering column when in operation;
   wherein the steering column described in claim 9 is used as the steering column.

* * * * *